(12) United States Patent
Evans et al.

(10) Patent No.: US 11,636,565 B1
(45) Date of Patent: Apr. 25, 2023

(54) TAMPER DETECTION ARRANGEMENTS, AND POINT OF SALES SYSTEMS EMPLOYING SAME

(71) Applicant: Digimarc Corporation, Beaverton, OR (US)

(72) Inventors: Eric D. Evans, Portland, OR (US); Arthur L. Powell, Kent, WA (US); Becky G. Kiichle-Gross, Tigard, OR (US); Geoffrey B. Rhoads, West Linn, OR (US); Philip J. Stafford, Las Vegas, NV (US); Utkarsh Deshmukh, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 260 days.

(21) Appl. No.: 16/937,514

(22) Filed: Jul. 23, 2020

Related U.S. Application Data

(60) Provisional application No. 62/955,990, filed on Dec. 31, 2019, provisional application No. 62/895,958, filed on Sep. 4, 2019, provisional application No. 62/878,266, filed on Jul. 24, 2019.

(51) Int. Cl.
| | | |
|---|---|---|
| *G06T 1/00* | (2006.01) | |
| *G06Q 30/00* | (2012.01) | |
| *G06K 7/14* | (2006.01) | |
| *G06T 7/73* | (2017.01) | |
| *G06Q 30/018* | (2023.01) | |

(52) U.S. Cl.
CPC .......... *G06T 1/0042* (2013.01); *G06K 7/1413* (2013.01); *G06Q 30/0185* (2013.01); *G06T 7/73* (2017.01)

(58) Field of Classification Search
CPC ....... G06T 1/0042; G06T 7/73; G06K 7/1413; G06K 19/00; G06Q 30/0185
USPC .............................. 383/103; 235/487; 283/81
See application file for complete search history.

(56) References Cited

U.S. PATENT DOCUMENTS

| | | |
|---|---|---|
| 6,978,036 B2 | 12/2005 | Alattar |
| 7,246,239 B2 | 7/2007 | Rodriguez |
| 7,856,116 B2 | 12/2010 | Rodriguez |
| 8,224,018 B2 | 7/2012 | Rhoads |
| 8,509,472 B2 | 8/2013 | Rodriguez |
| 9,898,793 B2 | 2/2018 | Rodriguez |
| 10,915,804 B1 * | 2/2021 | Shmulevich ......... G06Q 10/083 |
| 2003/0121984 A1 * | 7/2003 | Pinchen ................. B42D 25/40 235/487 |
| 2003/0187798 A1 | 10/2003 | McKinley |
| 2003/0215112 A1 | 11/2003 | Rhoads |
| 2004/0013285 A1 | 1/2004 | Jordan |
| 2004/0039914 A1 | 2/2004 | Barr |
| 2005/0010776 A1 | 1/2005 | Kenen |
| 2005/0063562 A1 | 3/2005 | Brunk |

(Continued)

*Primary Examiner* — Edwyn Labaze
(74) *Attorney, Agent, or Firm* — Digimarc Corporation

(57) ABSTRACT

Authenticity of a sticker (e.g., a mark-down sticker on a retail item), or integrity of a closure (e.g., on a delivery bag or package), is confirmed by reference to spatial information. In some embodiments a fingerprint is formed from parameters describing spatial placement of a sticker or pattern on a substrate. In some embodiments a digital watermark pattern provides a spatial frame of reference within which one or more other features can be located. A great many other features and arrangements are also detailed.

32 Claims, 21 Drawing Sheets

(56) References Cited

U.S. PATENT DOCUMENTS

| | | |
|---|---|---|
| 2006/0147082 A1 | 7/2006 | Jordan |
| 2006/0171558 A1 | 8/2006 | Alattar |
| 2007/0098213 A1 | 5/2007 | Rhoads |
| 2008/0164689 A1 | 7/2008 | Jordan |
| 2011/0262536 A1 | 10/2011 | Jordan |
| 2012/0243797 A1* | 9/2012 | Di Venuto Dayer ... G06V 20/66 382/218 |
| 2013/0320087 A1* | 12/2013 | Moran ................ G06K 19/18 235/440 |
| 2014/0190050 A1* | 7/2014 | Raming ............... G09F 3/0288 427/256 |
| 2014/0217173 A1* | 8/2014 | Anand ............... G06K 19/0614 235/487 |
| 2017/0286769 A1 | 10/2017 | Di Venuto Dayer, V |
| 2018/0268214 A1 | 9/2018 | Kutter |
| 2022/0242160 A1* | 8/2022 | Gaathon ............... B42D 25/21 |

\* cited by examiner haretra massa massa ultricies mi quis hendrerit.
er sit amet _____ am eget felis eget. Vitae
n curab _____ d velit. Est lorem ipsum
met c _____ . Etiam erat velit
e in _____ a erat. Tellus mauris
cen _____ attis ullamcorper ve
corp _____ tus urna duis. Nunc
nper _____ a rutrum quisque. N
isque _____ r eu augue. Nunc
e viverra _____ am sem fringilla ut. Tellu
itasse platea c _____ mst vestibulum. Eget magna
n iaculis eu non diam phasellus vestibulum. Mort
rsus risus at. Posuere urna nec tincidunt praeser
ugiat. Cursus euismod quis viverra nibh cras.
um sociis natoque penatibus et magnis dis
Interdum velit laoreet id donec ultrices. Volutpat

FIG. 13

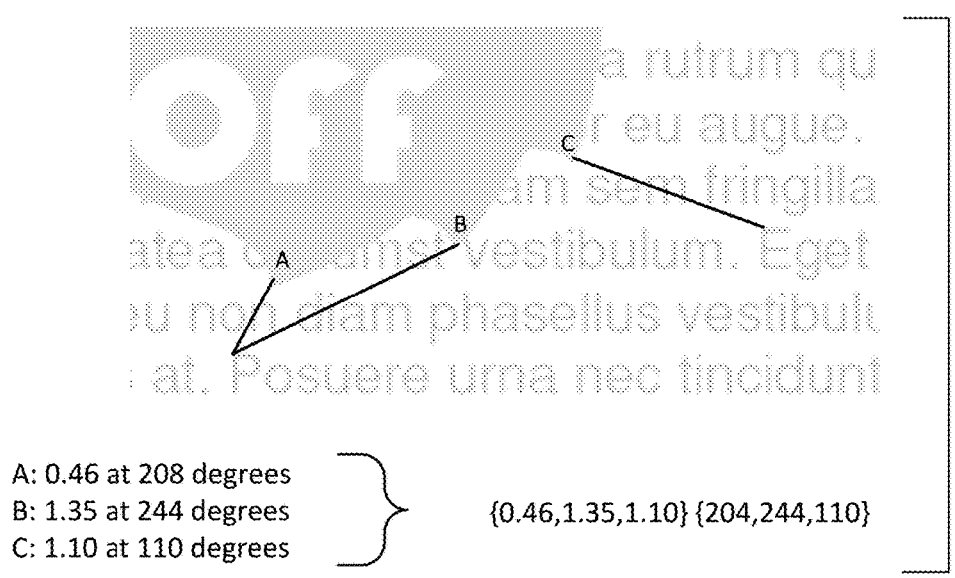

A: 0.46 at 208 degrees
B: 1.35 at 244 degrees    {0.46,1.35,1.10} {204,244,110}
C: 1.10 at 110 degrees

FIG. 14

| FINGERPRINT DATA | DISCOUNT | GTIN | DATE |
|---|---|---|---|
| {0.23, 0.38, 1.11} {220, 156, 82} | 20% | 060251113575 | 7/20/2019 |
| {1.34, 1.21, 1.12} {204, 218, 113} | 20% | 060251113575 | 7/20/2019 |
| {0.54, 0.88, 0.09} {106, 195, 169} | 20% | 060251113575 | 7/20/2019 |
| {1.11, 0.57, 0.82} {196, 150, 47} | 20% | 060251113575 | 7/20/2019 |
| {1.47, 0.80, 0.73} {234, 121, 104} | 20% | 060251113575 | 7/20/2019 |
| {0.46, 1.35, 1.10} {204, 244, 110} | 20% | 060251113575 | 7/20/2019 |
| {0.77, 1.59, 1.20} {202, 234, 127} | 20% | 060251113575 | 7/20/2019 |
| {0.68, 1.18, 1.57} {206, 128, 127} | $0.50 | 074604344081 | 7/21/2019 |
| {1.73, 1.38, 1.95} {94, 232, 49} | $0.50 | 074604344081 | 7/21/2019 |
| {1.08, 0.75, 1.00} {245, 84, 193} | $0.50 | 074604344081 | 7/21/2019 |

FIG. 17

Lorem ipsum dolor sit amet, consectetur adipiscing elit, sed do eiusmod tempor incididunt ut labore et dolore magna aliqua. Rutrum tellus pellentesque eu tincidunt. Curabitur gravida arcu ac tortor. Diam vel quam elementum pulvinar etiam non quam. Duis at consectetur lorem donec massa. Ipsum dolor sit amet consectetur adipiscing. Urna et pharetra pharetra massa massa ultricies mi quis hendrerit. Ullamcorper sit amet risus nullam eget felis eget. Vitae elementum curabitur vitae nunc sed velit. Est rem ipsum dolor sit amet consectetur adipiscing erat velit scelerisque in dictum. Tellus mauris a diam maecenas sed enim ut ullamcorper velit. sed ullamcorper morbi tincidunt ornare duis. Nunc sed id semper risus in hendrerit quisque. Nisl nisi scelerisque eu ultrices vitae auctor. Nunc scelerisque viverra mauris in aliquam sem fringilla ut. Tellus in hac habitasse platea dictum vestibulum. Eget magna fermentum iaculis eu non diam phasellus vestibulum. Morbi blandit cursus risus at. Posuere urna nec tincidunt praesent semper feugiat. Cursus euismod quis viverra nibh cras. Gravida cum sociis natoque penatibus et magnis dis parturient. Interdum velit laoreet id donec ultrices. Volutpat diam ut venenatis tellus. Sed elementum tempus egestas sed.

TAMPER DETECTION ARRANGEMENTS, AND POINT OF SALES SYSTEMS EMPLOYING SAME

RELATED APPLICATION DATA

This application claims priority benefit to provisional applications 62/955,990, filed Dec. 31, 2019, 62/895,958, filed Sep. 4, 2019, and 62/878,266, filed Jul. 24, 2019. These applications are incorporated herein by reference.

BACKGROUND AND INTRODUCTION

As retailers compete for business, they reduce prices, which reduces margins. To stay in business, it is essential that retailers trim costs. A big cost for many retailers is "shrinkage," or more plainly, theft.

One type of theft is labeling fraud. In one form of labeling fraud a criminal may apply a fraudulent "40% off" sticker to a package of steak in a chiller case, and an accomplice later picks up the package and presents it to a clerk for checkout. If the sticker is a reasonable facsimile of stickers normally used by the store for markdown purposes, the clerk may be tricked into manually applying a 40% discount to the marked price, benefiting the fraudsters at the expense of the store.

Another form of labeling fraud involves dynamic pricing. Some stores lower prices on items that are nearing their sell-by dates. The sell-by date is printed in human-readable form on the package, and can also be encoded within the package barcode. The checkout terminal system can be programmed to respond to sell-by date information decoded with the barcode data, by applying a discount if the product is presented for sale on that date (or shortly before).

Criminals can exploit dynamic pricing for their advantage. For example, a criminal may craft a counterfeit label for a package of steak, including a barcode that has generally correct data for the steak, but includes the current date as the sell-by date. The criminal surreptitiously applies the counterfeit label to a freshly-packaged steak in a chiller case—on top of the true label. Again, an accomplice soon picks up the relabeled steak, and presents it for purchase at the front of the store. The store's dynamic pricing system is tricked into believing that the steak's sell-by date is today, and a generous discount is applied—again cheating the store.

Stores could charge lower prices to the public if such frauds could be deterred.

In certain aspects, applicant's work combats such frauds by technical measures.

A related concern involves foods delivered to consumers' doors, e.g., by delivery drivers. A problem with certain drivers is that they snack on the foods while en route—stealing a few French fries, or worse. In certain aspects, applicant's work also combats such frauds by technical measures.

Related embodiments to detect tampering with corrugated shipping boxes are also detailed.

The foregoing and other features and advantages of the present technology will be more readily apparent from the following detailed description, which proceeds with reference to the accompanying drawings.

BRIEF DESCRIPTION OF THE DRAWINGS

FIG. 13 shows an excerpt of imagery depicting a mark-down sticker applied to product packaging.

FIG. 14 is an excerpt from FIG. 13, conceptually illustrating how one type of fingerprint data can be derived from feature points on the sticker and feature points in the product packaging.

FIG. 17 conceptually illustrates an excerpt from a data structure in which reference fingerprint data and other information are stored, for use by a point-of-sale system in authenticating mark-down stickers.

FIG. 18 conceptually illustrates how another type of fingerprint data can be derived from a discount sticker's relationship to nearby feature points.

DETAILED DESCRIPTION

Nearly every retail package is marked with a printed symbology (barcode) that encodes a Global Trade Identification Number ("GTIN") to identify the item. The GTIN for a 12 oz. box of Kellogg's Corn Flakes cereal is 038000001109. This 12-digit code comprises a prefix identifying Kellogg's as the owner, i.e., 038000, and 5 more digits that serve as an item reference number for Corn Flakes cereal among Kellogg's offerings, i.e., 00110. The final digit is a check digit, computed from the earlier 11 digits. (Company prefixes can be longer or shorter than six digits, in which case the item reference numbers are shorter or longer.)

GTINs, and other aspects of most barcodes, are standardized by specifications published by GS1, a non-profit industry group.

Figure 1:
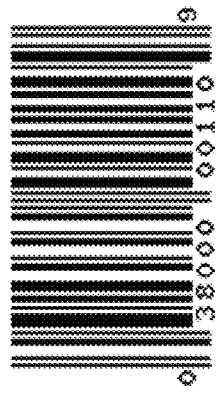
FIGS. 1-6 illustrate various different forms of barcodes, each conveying the GTIN for a box of Kellogg's Corn Flakes cereal.
Figure 2:
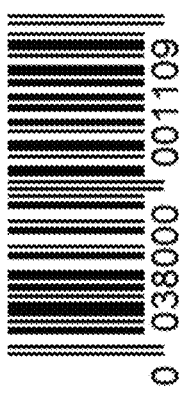
Figure 3:
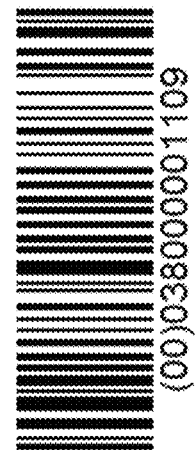

A GTIN can be conveyed by many different symbologies (sometimes termed "indicia" or "data carriers," or more commonly "barcodes"). Most common is the UPC-A symbology, as shown in FIG. 1. Other symbologies, e.g., EAN-13 shown in FIG. 2 and GS1-128 shown in FIG. 3, carry 13- and 14-digit counterparts to this code. The Digimarc Barcode indicia also carries a 14-digit counterpart, and can carry other information as well. All such payloads convey the same GTIN; they are semantically equivalent. The shorter ones are left-padded with zeroes to extend their lengths to 14 digits.

UPC-A 038000001109
EAN-13 0038000001109
GS1-128 00038000001109
Digimarc Barcode 00038000001109

The Digimarc Barcode indicia is different from conventional barcodes in various respects. One is that it is less visually obtrusive. Another is that it commonly takes the form of a square block of data (e.g., encoding a 98 bit binary payload), and this block of data is redundantly tiled across and down the printed medium.

Figure 7:
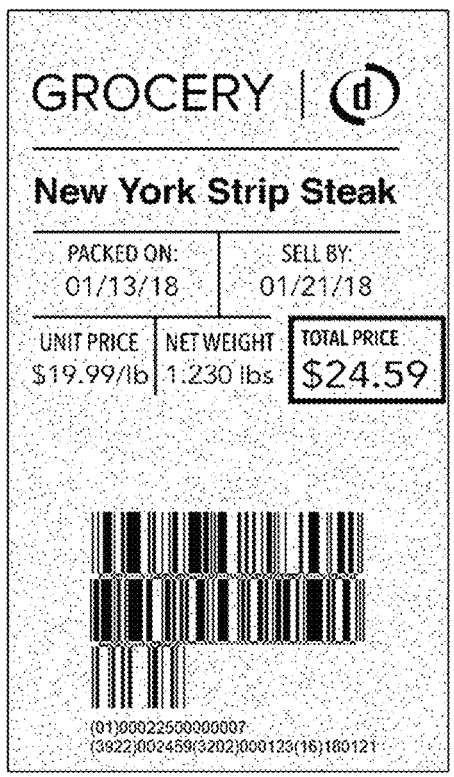
FIG. 7 is a food label bearing both a conventional (DataBar) barcode, and a Digimarc Barcode indicia.
Figure 7A:
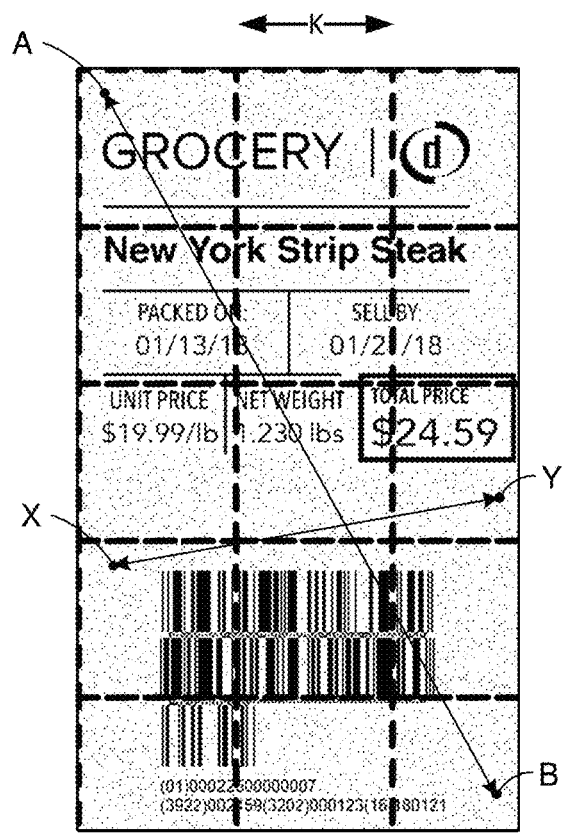
FIG. 7A is FIG. 1 overlaid with markings showing a block encoding 98 binary bits that is repetitively tiled across the label by the Digimarc Barcode indicia.

FIGS. 7 and 7A show a label printed with both a Digimarc Barcode indicia (the subtle patterning in the background of the label), together with a DataBar indicia. The redundant tiling of the Digimarc Barcode indicia is indicated by the dashed squares in FIG. 7A. Such redundant tiling is sometimes termed "holographic" encoding. "Holographic" here means that redundant representations of the payload data are printed in a tiled array, with a periodic spacing of K inches vertically and horizontally, and that the encoding spans an area large enough that two points on an encoded label, that are a distance of 2.5K apart, are both amidst areas of spatially coherent encoding patterns, e.g., points X and Y in FIG. 7A. (Often points separated by a larger distance, e.g., 3 or 4K, are still amidst such patterns, as in points A and B in FIG. 7A.) The blocks are usually square, but can be other shapes, e.g., rectangles or hexagons.

Figure 5:
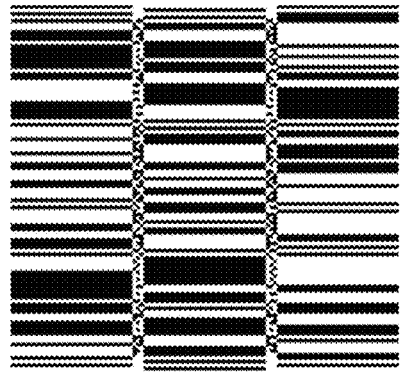

Barcodes, both conventional and the Digimarc Barcode indicia, can carry information in addition to the GTIN, such as weight, price and sell-by date, as well as other data. Each such element is prefixed by a code (an "Application Identifier," or AI) that indicates what the following "element value" data represents. An AI of "01" precedes a 14-digit GTIN element value. An AI of "16" precedes a sell-by date element value, in YYMMDD format. An AI of "30" precedes an item count element value. An AI of "3922" precedes a price—with 2 digits after the decimal point. An AI of "3103" precedes a weight in kilograms, with 3 digits after the decimal point. Again, GS1 standards specify these AIs and their details. DataBar indicia, as shown in FIGS. 5 and 7, are presently popular for conveying such extended information payloads, although the Digimarc Barcode indicia is similarly capable.

Figure 4:
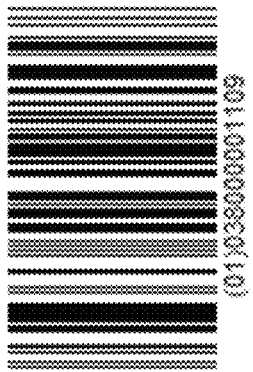
Figure 6:
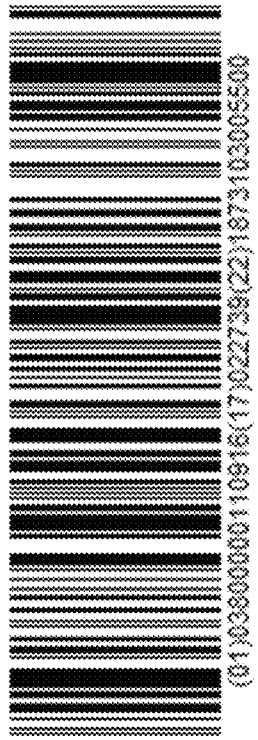

FIG. 4 shows the Kellogg's Corn Flakes GTIN, alone, encoded in DataBar format. FIGS. 5 and 6 show the same GTIN in DataBar format, extended with fictional sell-by, price, and weight data. FIG. 5 shows a "stacked" arrangement; FIG. 6 shows a linear arrangement.

The payload string encoded in the latter two symbologies is:

(01)038000001109(16)170227(3922)187(3103)005500

To aid in visual understanding, the four Application Identifiers in this string are indicated by parentheses. No parentheses are actually encoded.

Existing point-of-sale scanners, such as are marketed by Datalogic S.p.A., NCR Corp., and Zebra Technologies, Corp., can be configured with multiple decoding modules to decode different types of indicia. For example, a scanner may include a first module to decode UPC-A indicia, a second module to decode DataBar indicia, and a third module to decode Digimarc Barcode indicia. Some modules are created by the hardware companies; other modules are authored by third parties (e.g., modules used to decode Digimarc Barcode indicia are generally authored by Digimarc Corp.).

The data output from the scanner (e.g., to an attached point-of-sale terminal, such as electronic cash register) may be prefixed by a data tag indicating the type of indicia from which the output data was decoded. This helps the attached device parse the data. However, while tags have been standardized for DataBar indicia and other popular indicia, no standard tag has yet emerged to denote a Digimarc Barcode indicia. Accordingly, in systems employing such tags, a tag of a different type of indicia, e.g., a tag for a DataBar indicia, may accompany data decoded from a Digimarc Barcode indicia.

This shortcoming is a legacy one. The interface between the scanner and the terminal is generally standardized to permit different scanners to work with different terminals. The interface was designed years ago, before the Digimarc Barcode indicia gained prominence.

In accordance with certain aspects of the present technology, a scanner indicates, to a connected point-of-sale terminal, that a particular type of symbology was decoded to produce the GTIN information—without use of an accompanying data tag. In some embodiments such information is communicated without making any change to the hardware interface. In a particularly preferred embodiment, such information is communicated by a form of GTIN string sent from the scanner to the terminal.

Such indication of symbology type, from which particular GTIN data was decoded, can be used to combat label fraud.

Consider dynamic pricing. Some retailers employ the Digimarc Barcode indicia for dynamic pricing in order to enhance security. One reason for such selection is that software for generating many forms of barcode indicia with a given payload—including sell-by date—are freely available on the web. However, tools to generate Digimarc Barcode indicia are not so commonly available.

The enhanced security afforded by the harder-to-counterfeit Digimarc Barcode indicia, however, could be thwarted if a criminal applied a label using a different symbology, such as a DataBar indicia, over the original product label, and the point-of-sale terminal was not alert to the difference. In such case, a falsified sell-by date in the DataBar indicia could trick the point-of-sale system into applying a discount on the fraudulently-relabeled item. If data decoded from a Digimarc Barcode indicia could be recognized as such, by the point-of-sale terminal, such fraud could be prevented. That is, the terminal could apply a dynamic pricing discount only if the sell-by date is indicated to have been decoded from a Digimarc Barcode indicia.

Another situation in which it would be desirable for a point-of-sale terminal to be able to identify a GTIN data sequence as originating from Digimarc Barcode indicia involves coupons. Coupons commonly include a machine-readable indicia that indicates the merchandise to which the coupon applies, and a discount amount. Again, to enhance security, some coupon producers may employ the Digimarc Barcode indicia. Thus, it would be desirable—when a point-of-sale terminal receives decoded coupon information—to determine that the coupon information originated from a Digimarc Barcode indicia, and not from some other type of indicia that a criminal might counterfeit more readily.

Still another such situation involves discount stickers. If a product is damaged (e.g., if a box of cereal is dented), the retailer may apply an adhesive sticker printed with a human-readable "50% Off!" message. In some embodiments, the sticker may also be encoded with a machine-readable indicia to which the point-of-sale terminal responds by applying a 50% discount. The encoding may be effected by a Digimarc Barcode indicia to make counterfeiting of such a sticker more difficult. Again, it would be desirable for the point-of-sale terminal to confirm that the discount instructions originated from a Digimarc Barcode indicia, and not from an indicia of another type.

In accordance with one aspect of the present technology, a module for decoding Digimarc Barcode indicia (commonly found in the point-of-sale scanner) acts to change the payload decoded from the indicia in a distinctive manner so that the source of the data can be identified as a Digimarc Barcode indicia. For example, the length of the transmitted payload can be extended (padded) to a length beyond a maximum length that can be produced by other types of indicia (or that can be produced by their respective decoding modules).

To illustrate, DataBar indicia are commonly limited to 74 numeric digits (or 41 alphanumeric characters). This limit reflects practicality—a payload larger than this would result in a symbology that is typically too large to print on a label, and too unwieldy to capture in image. A payload decoded from a Digimarc Barcode indicia may be transformed to have a length greater than the DataBar limit. That is, we generate a data structure that is physically difficult to create in open data carriers, such as the DataBar indicia.

For expository convenience, imagine the symbol limit of a DataBar indicia is 24 digits instead of 74 digits. And consider a Digimarc Barcode indicia that conveys a payload of nine digits, e.g.:

123456789

Such a payload can be transformed to exceed the 24 digit limit in countless ways. One is to replicate individual digits, serially, e.g.:

111222333444555666777888999

Another is to repeat the payload in reverse order several times, e.g.:

987654321987654321987654321

Another is to prepend (or post-pend) a dummy string, e.g.:

100000000000000000123456789 or 620209071482521613123456789

All such transformed codes have been padded to a length of 27 symbols—a value that exceeds the hypothetical limit of 24.

As noted, the number of possible data expansion techniques is essentially limitless. Other techniques include applying mathematical operations to some or all of the originally-decoded payload (e.g., raising it to the tenth power, and subtracting one; or taking the square root and moving the decimal place 20 positions to the right, etc.), or modifying, shuffling, and replicating symbols according to an algorithm. Hash functions and cryptographic transforms can likewise be applied.

Such transformation can be applied to part(s) of the payload decoded from the Digimarc Barcode indicia, while leaving other part(s) of the payload unchanged. For example, an Application Identifier code may be transformed, and/or its associated value may be transformed. Likewise, expansion can be conditioned on presence of some other attribute.

Consider a Digimarc Barcode that conveys the digit GTIN 038000001109, followed by a 2-digit Application Identifier code of 16 (indicating expiration date), followed by a 6-digit expiration date value, such as 190731, yielding a 20 digit string, i.e.:

03800000110916190731

The Digimarc Barcode decoding module may transform this code to have a length beyond the hypothetical limit of 24 symbols by including a predetermined number of repeats of the AI=16 code, e.g. seven in all:

0380000011091616161616161616190731

Similarly, the date value associated with this AI code can be repeated or otherwise transformed, to yield an output data sequence that exceeds the limit of 24 symbols, e.g.:

03800000110916137091137091137091

(The date value is here repeated in reverse order multiple times.)

Some such transformations would break existing GS1 parsing rules for application identifiers. Preferable is to use valid GS1 AI syntax/structure, but synthesize or repeat whole elements of that syntax. So there could be additional AI=01 elements, or multiple complete synthesized elements.

The expansion operation applied to the original payload, to yield the expanded payload, may be reversible, or not. In the former case, the associated point-of-sale terminal may apply a reciprocal process to recover the original payload from the expanded payload. That is, the expanded payload may be parsed to extract the original, shorter, payload. In the latter case, the point-of-sale terminal may simply be programmed to operate on the expanded data. For example, if a sequence longer than the DataBar limit is received, then the terminal may interpret "16161616161616" as an Application Identifier signifying that the following six symbols express an expiration date value in YYMMDD format.

The enlarged data sequence output by the Digimarc Barcode decoding module may be compliant with GS1 standards, or it may not. As noted, the enlarged data sequence is desirably made compliant with the standard. (By "GS1 standard" applicant means the "GS1 General Specifications, Release 19.1, July, 2019," which is freely available from online sources, such as at the web site www<dot>gs1<dot>org/standards/barcodes-eperfid-idkeys/gs1-general-specifications, and at corresponding web archives—such as web<dot>archive<dot>org. The standard is familiar to artisans in the field.)

One way to make an enlarged data sequence GS1 standard-compliant is to take an original, standard-compliant payload extracted from an indicia, and extend it by post-pending a further, valid, Application Identifier code, followed by a GS1 standard-compliant value (which may comprise a large number of further symbols).

As noted, the GS1 standard identifies different Application Identifier codes and their permitted value lengths. An excerpt from the standard illustrates:

| AI Code | Description | Value Field Length |
|---|---|---|
| 1 | Global Trade Item Number (GTIN) | 14 |
| 2 | GTIN of contained trade items | 14 |
| 10 | Batch or lot number | 20 |
| 11 | Production date (YYMMDD) | 6 |
| 12 | Due date (YYMMDD) | 6 |
| 13 | Packaging date (YYMMDD) | 6 |
| 15 | Best before date (YYMMDD) | 6 |
| 16 | Sell by date (YYMMDD) | 6 |
| 17 | Expiration date (YYMMDD) | 6 |
| 20 | Internal product variant | 2 |
| 21 | Serial number | 20 |
| 22 | Consumer product variant | 20 |
| 235 | Third Party Controlled, Serialised Extension of GTIN (TPX) | 28 |
| 240 | Additional product identification assigned by the manufacturer | 30 |
| ... | ... | ... |

One Application Identifier code suitable for expanding a data sequence is "21," which signals that a "Serial number" of up to 20 digits is to follow. Another suitable Application Identifier code is "240," which signals that "Additional product identification assigned by the manufacturer" follows, comprising up to 30 digits. Another suitable code is "241," meant to convey "Customer part number" data of up to 30 digits. Essentially any AI code that signals a following value of sufficient symbol length can be used, e.g., 10 (20 symbols), 235 (28 symbols), 400 (30 symbols), 8200 (70 symbols), any of 91 through 99 (90 symbols each), etc.

Any valid Application Identifier code can be post-pended to a valid GS1 payload, and then additional symbols—up to the specified limit—can follow as an associated value. (Indeed, if desired, a series of two or more such AI codes—each followed by a corresponding string of symbols—can be used.) An AI code (or codes) that does not trigger any action in the POS terminal is desirably employed in this context. For example, a POS terminal configured for grocery store use commonly takes no action if it encounters a code 21 "Serial number." Other than possibly storing the received datum in a data archive, the terminal disregards such AI code and associated value symbols.

The Digimarc Barcode decoding module may not expand all payloads decoded from Digimarc Barcode indicia. The decoding module may transform some payloads, and not others. For example, it may only transform payloads in which a particular AI code is found (e.g., an AI code indicating a coupon, or a sell-by date), while other payloads are transmitted from the scanner in non-expanded, original form.

FIGS. 8-12 illustrate certain aspects of the foregoing.

Figure 8:
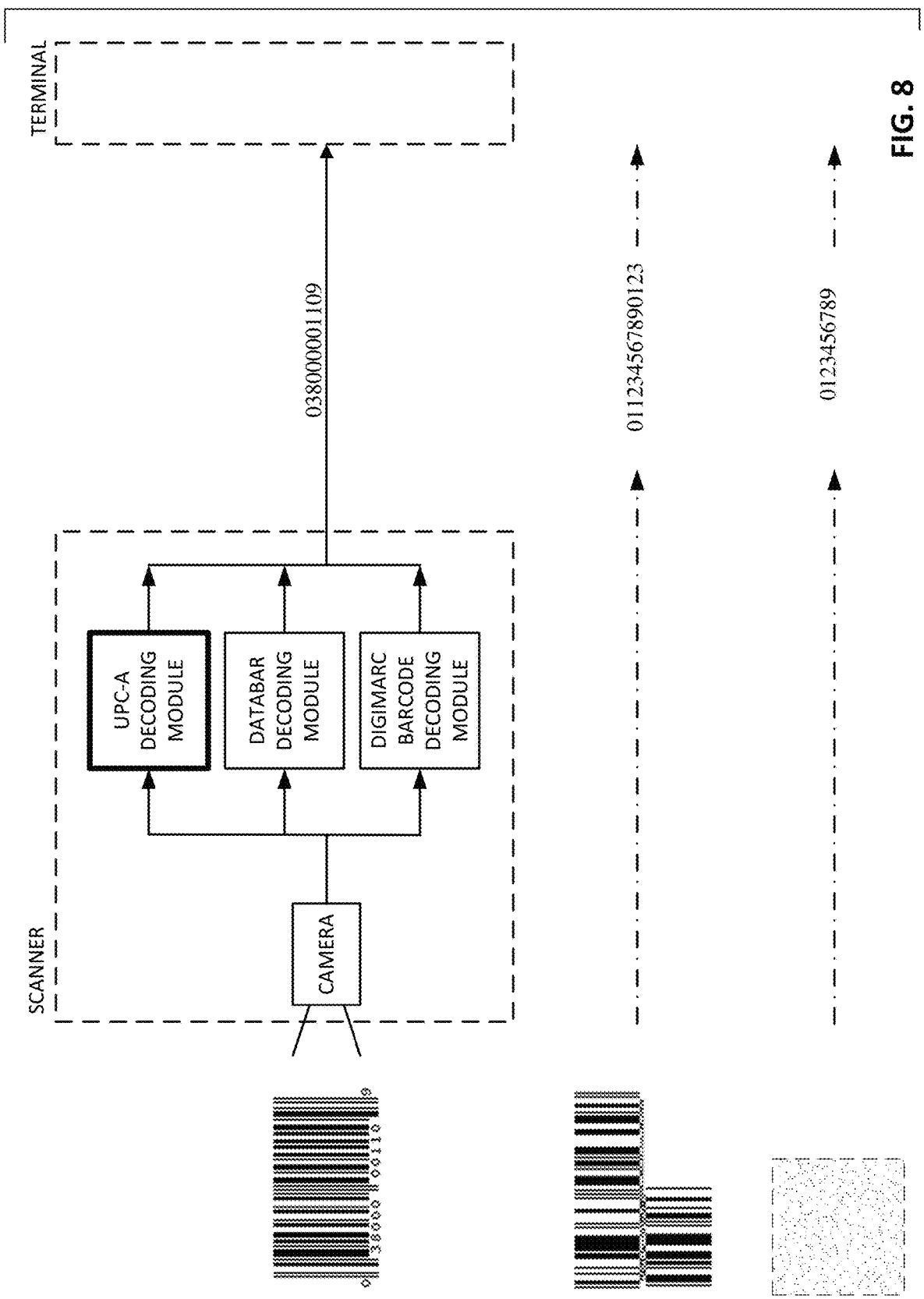
FIG. 8 is a block diagram of a prior art point-of-sale system in which a scanner captures imagery depicting different barcode symbologies, and produces output data sequences that do not indicate the type of symbology from which each was decoded.

FIG. 8 shows a point-of-sale system, without the present technology. A scanner system is coupled to a terminal system. The scanner system encounters different symbologies, shown at the left. The top symbology is a UPC-A code. The middle symbology is a DataBar code. The bottom symbology represents a Digimarc Barcode indicia. The scanner is equipped with three modules for decoding these three types of symbologies, respectively. Typically, a camera sub-system of the scanner provides imagery to all of the decoding modules, but only one of the modules produces valid data in response to any given patch of imagery. (Valid data may be ascertained by CRC data, by checking a GTIN check digit, or by other error checking technique.)

When the camera imagery includes a UPC-A code, the UPC-A decoding module outputs a data string decoded from such code (such as 038000001109 in the example). When the imagery includes a DataBar indicia, the DataBar decoding module outputs its respective payload (such as 011234567890123 in the example). When the imagery includes a Digimarc Barcode indicia, the Digimarc Barcode decoding module outputs its encoded payload (such as 0123456789 in the example).

(The scanner performs various other operations on the decoded data, such as to ensure that a particular indicia is not read twice from the same item, in successive image frames, causing a shopper to be double-charged. Additional information on point-of-sale scanners, including such further processing, is provided in applicant's U.S. Pat. No. 10,262,176 and application Ser. No. 16/444,959, filed Jun. 18, 2019, now published as US20190385034.)

The data string decoded by the scanner from indicia depicted in captured imagery is transmitted to an associated point-of-sale terminal, e.g., using a serial or USB data link. However, as noted, the type of symbology from which the data string was decoded is not indicated to the terminal unit.

Figure 9:
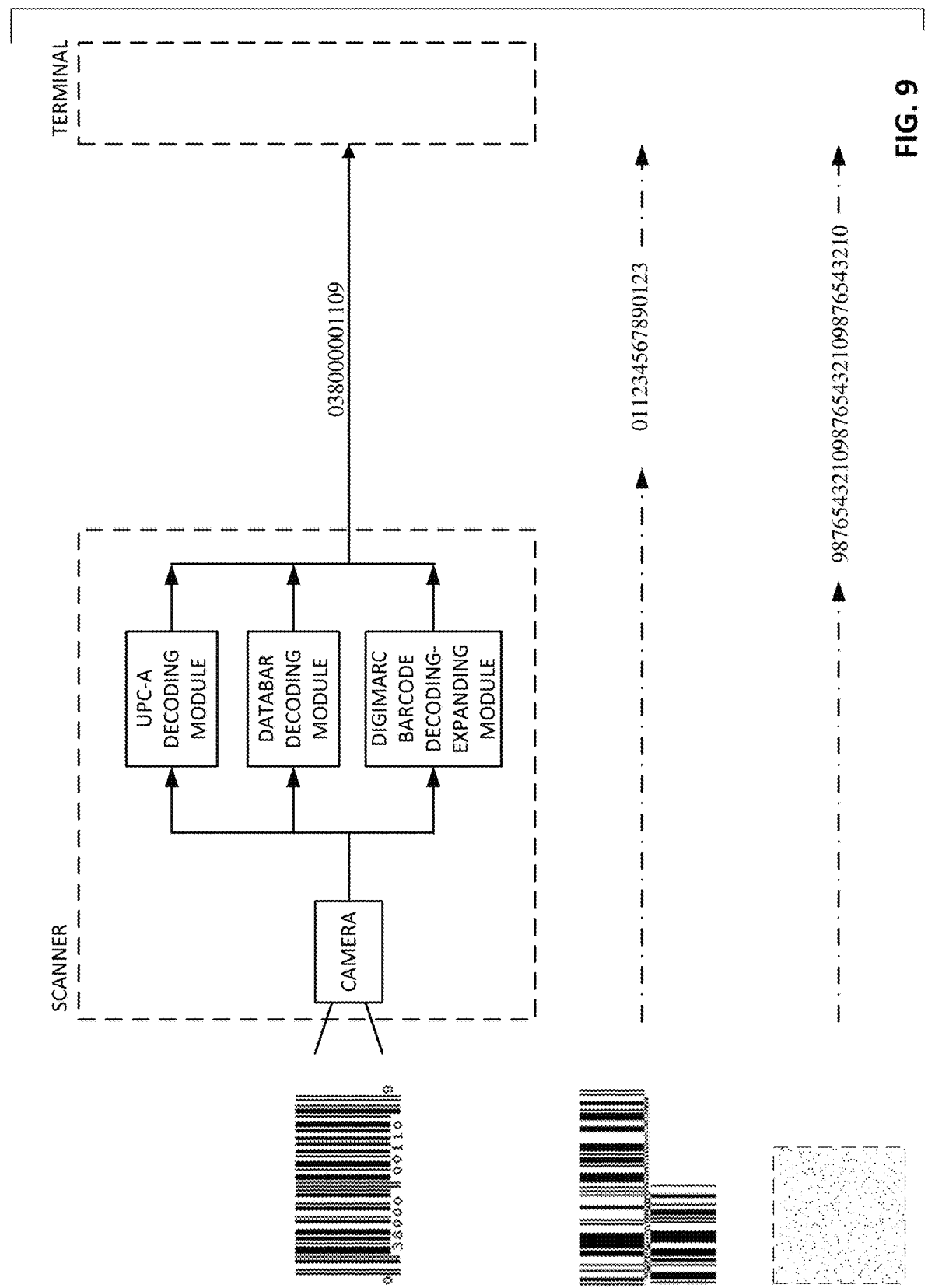
FIG. 9 is a block diagram of a point-of-sale system like FIG. 8, but characterized in that at least some output data sequences are modified to indicate the type of symbology from which they were decoded.

FIG. 9 shows such a system incorporating aspects of the present technology. In particular, while the depicted data strings decoded from the UPC-A and DataBar codes are not altered, the data string decoded from the Digimarc Barcode indicia is expanded. In this example the decoded payload of 0123456789 is reversed and replicated a total of three times, yielding a string length of 30 symbols. Usually, the expansion yields a still longer string—one whose length exceeds the maximum string length that can be conveyed by the other symbologies, or output by their respective decoding modules (e.g., longer than 74 digits, in the case of the DataBar symbology).

Figure 10:
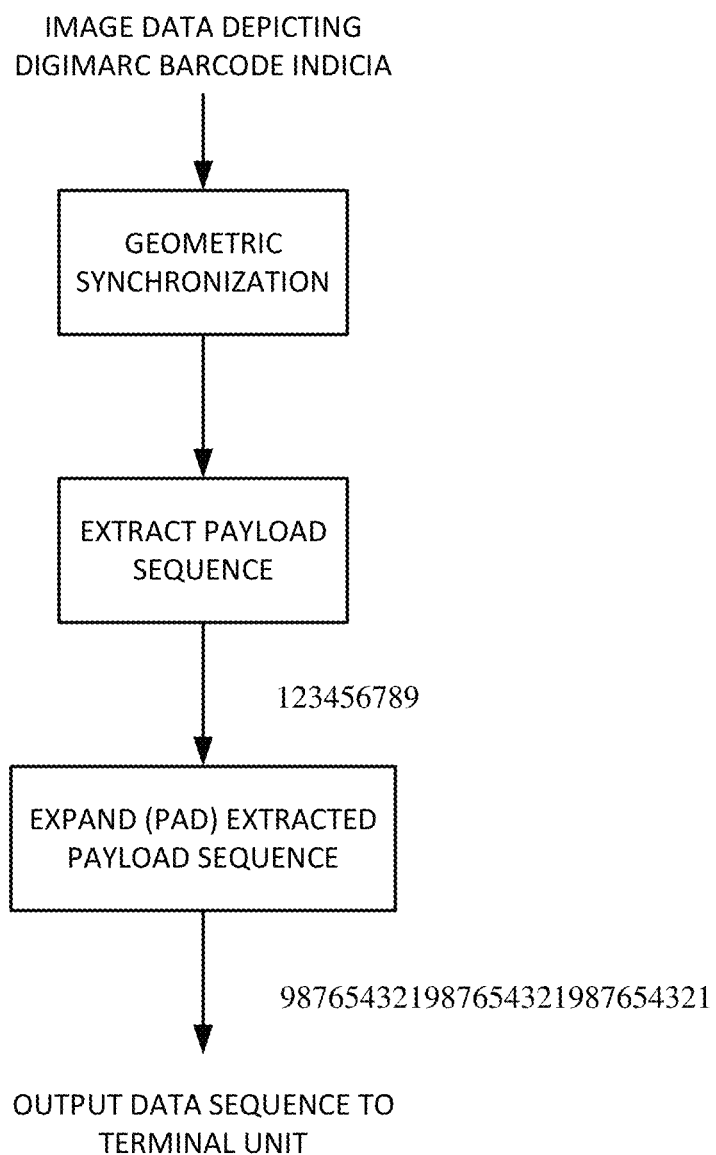
FIG. 10 is a flow chart illustrating operation of one illustrative decoding module for Digimarc Barcode indicia, employing certain aspects of the present technology.

FIG. 10 shows an algorithm that can be applied by the Digimarc Barcode indicia decoding module of FIG. 9. The input image data is processed to discern information characterizing the pose of the Digimarc Barcode indicia within the captured imagery (e.g., by scale, rotation, x-translation, and y-translation). The image data is then re-sampled (interpolated) based on such pose information to yield a sample corresponding to each location within the originally-encoded pattern. These samples are processed to extract the encoded payload. This payload is then expanded (padded) to yield a longer payload, e.g., longer than 74 digits. The expanded payload is then sent, like payload data decoded by the other modules, to the associated terminal unit over the serial data connection.

Figure 10A:
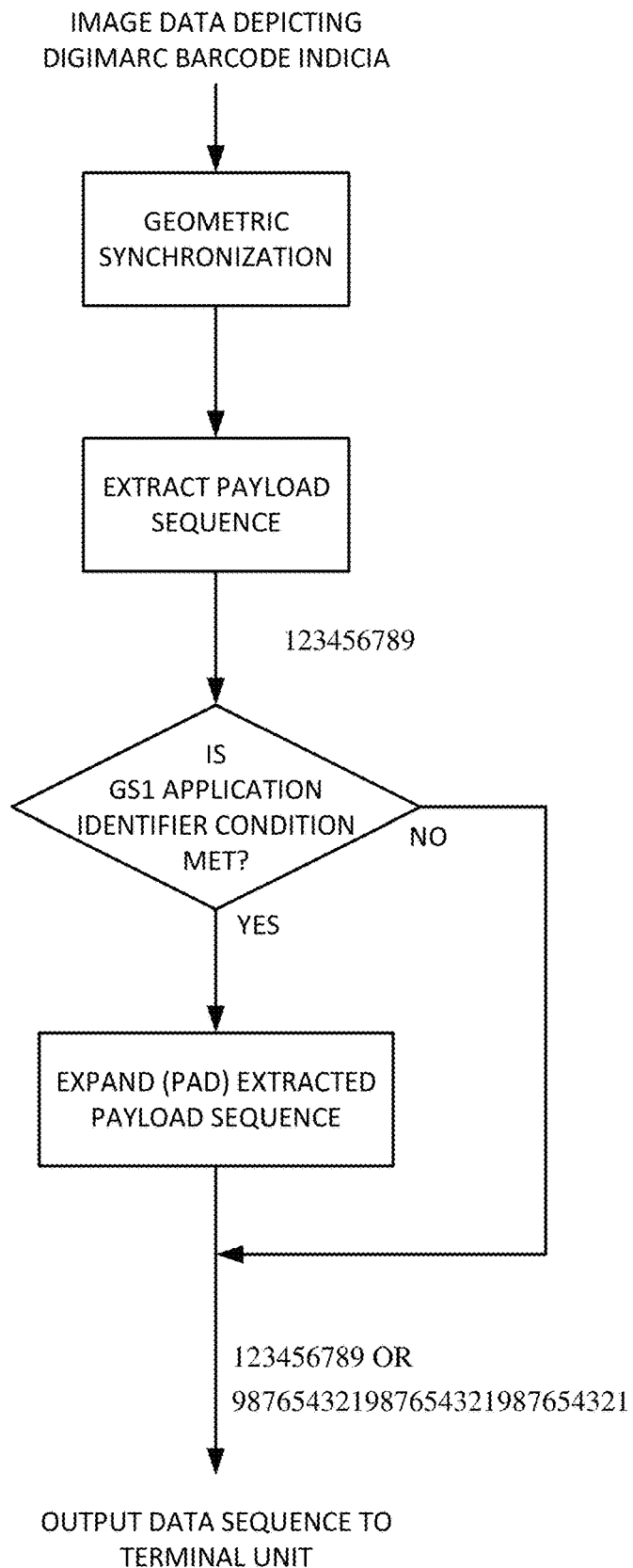
FIG. 10A is a variant of FIG. 10.

FIG. 10A shows a variant algorithm that can be applied by the Digimarc Barcode indicia decoding module of FIG. 9. In the FIG. 10A algorithm, the module examines the payload sequence extracted from the geometrically-synchronized imagery to determine if a certain condition is met. For example, does the extracted payload include a particular Application Identifier code (e.g., a code indicating a sell-by date value, or a code indicating a coupon)? If such a condition is met, the extracted payload sequence is expanded. Otherwise, it is output in its originally-extracted form.

Figure 11:
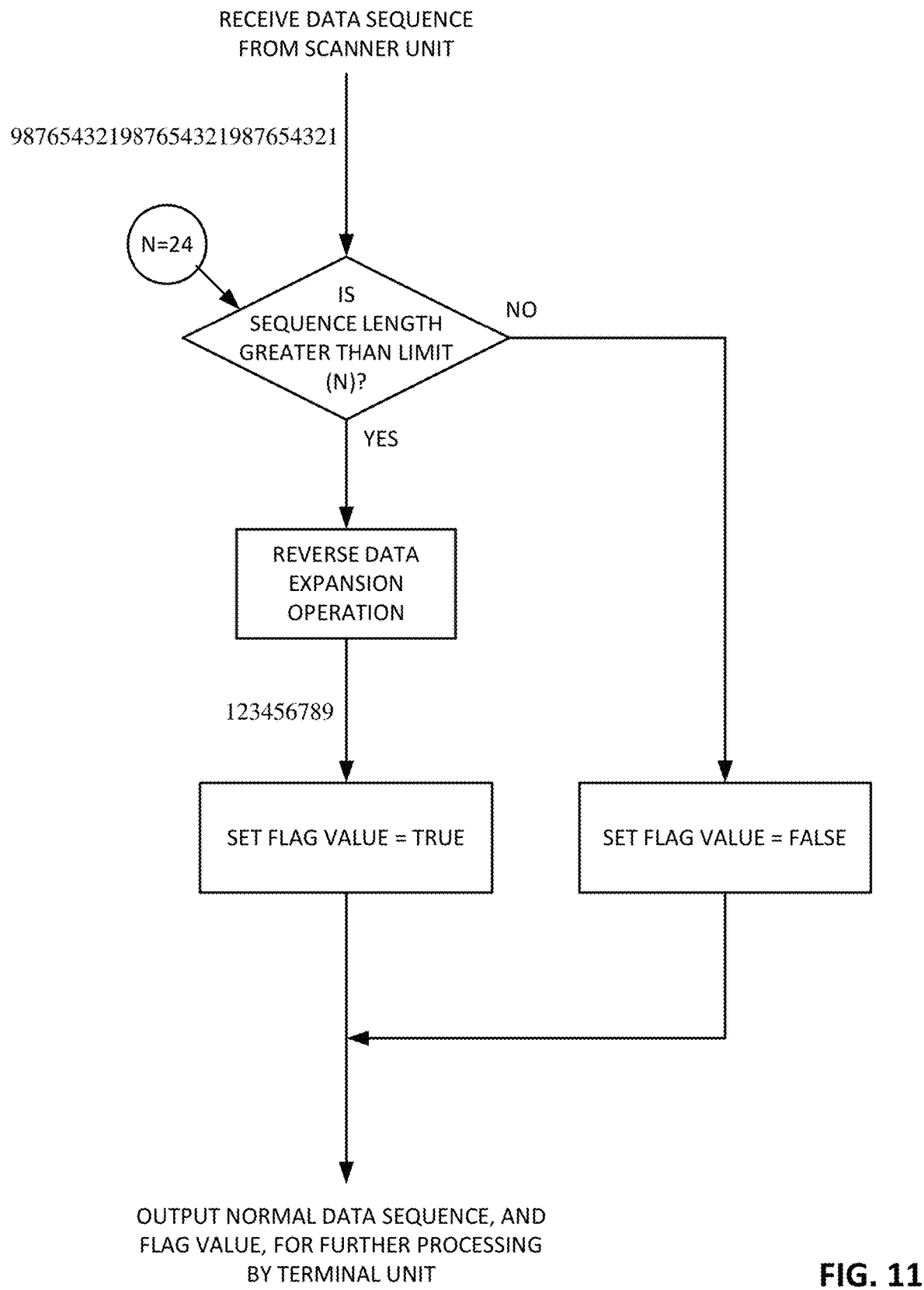
FIG. 11 is a flow chart illustrating certain operations of one illustrative point-of-sale terminal employing aspects of the present technology.

FIG. 11 details an exemplary algorithm that can be performed by the point-of-sale terminal unit shown at the right side of FIG. 9. A data sequence from the scanner unit is received, without any express indication of the module from which it originated. This sequence is tested to determine whether its length exceeds a threshold value. The threshold value (24 in this example) can be stored in memory in the terminal unit. If the data sequence is longer than this threshold value, a reverse data expansion operation is performed. In the example just-given, the reverse operation can comprise reversing the order of the received symbols, and discarding the last two-thirds of the symbols. What remains is the payload originally extracted by the Digimarc Barcode decoding module, i.e., 0123456789.

In the FIG. 11 algorithm the reverse data expansion operation is followed by setting a flag value to TRUE. This flag value indicates that the data sequence output at the bottom of FIG. 11, and processed by subsequent stages of the terminal unit, originated with a Digimarc Barcode indicia. Such flag value can serve as authentication for a sell-by date discount or coupon discount.

In contrast, if the length of the data sequence received from the scanner unit does not exceed the threshold value, no change is made to the data sequence, and the flag value is set to FALSE. If subsequent processing attempts to apply a discount, or other operation that should only be performed if the associated data originated with a Digimarc Barcode indicia, then this flag value of FALSE indicates that such operation should be refused or blocked.

Figure 11A:
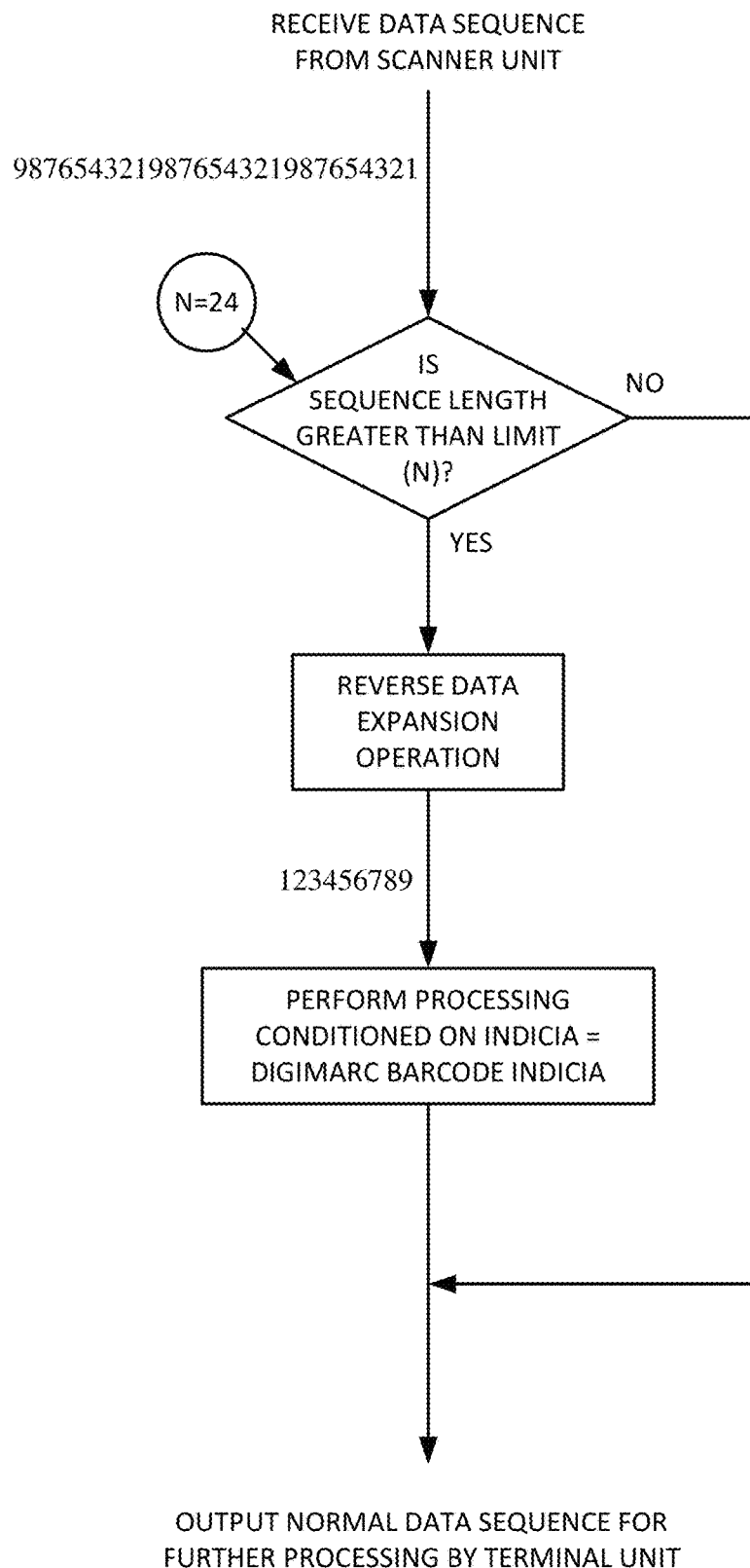
FIG. 11A is a variant of FIG. 11.

FIG. 11A shows a variant algorithm that can be performed by the point-of-sale terminal unit. In this algorithm, no flag value is set. Instead, operations that are authorized only in response to a data sequence from a Digimarc Barcode are performed as part of a program branch that follows the reverse data expansion operation. Such operations are not authorized otherwise.

Although less-preferred, a data sequence decoded from a Digimarc Barcode indicia can be identified by means other than by expanding to a length beyond a threshold. For example, Digimarc Barcode decoding module can post-pend an Application Identifier code, and associated value, to indicate that the sequence originated from a Digimarc Barcode indicia. For example, the GS1 AI code 99 can be used, followed by a value of 01, to indicate a Digimarc Barcode indicia was decoded. Other values can signal other types of indicia.

Figure 12:
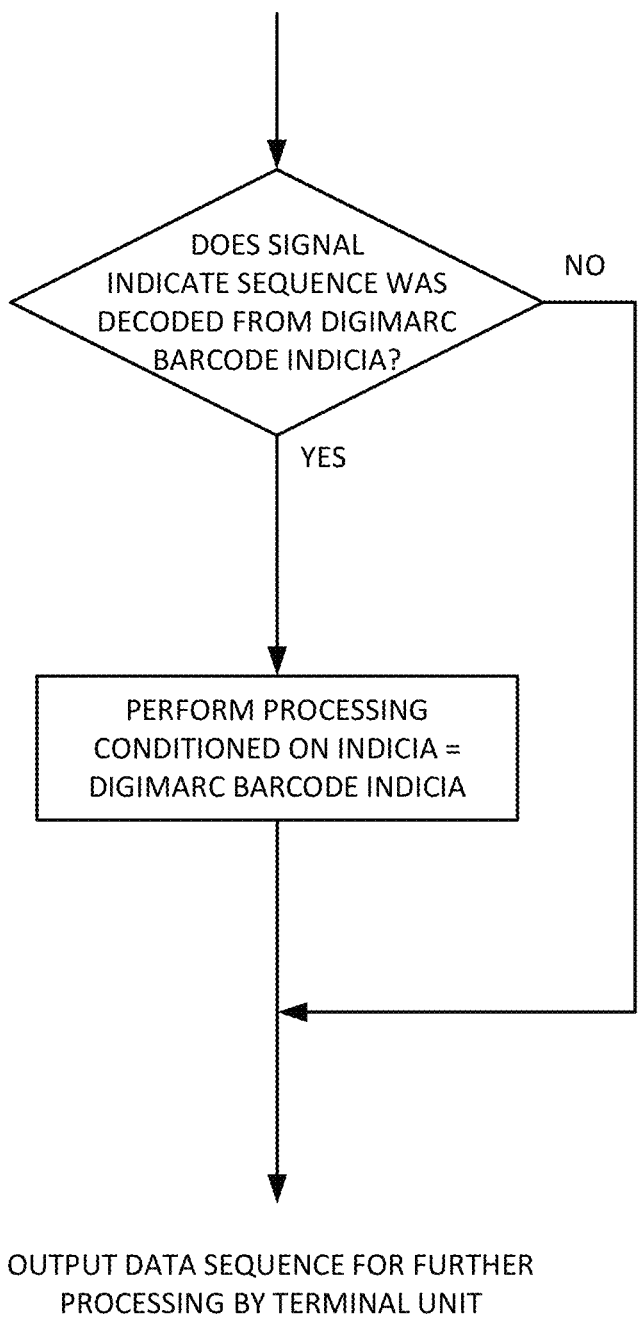
FIG. 12 is a flow chart illustrating certain operations of another illustrative point-of-sale terminal employing aspects of the present technology.

FIG. 12 illustrates a variant algorithm that can be performed by the point-of-sale terminal unit, encompassing the just-noted arrangement. In such algorithm, the terminal unit examines data from the scanner unit for a particular signal that indicates the type of decoded indicia. The signal can be a sequence included in the data string (as in the AI example just-given), or it may be a signal separate from the data string. (Some future scanners may be designed to transmit, apart from a GTIN string, data signaling the particular type of indicia from which the GTIN data was decoded.) If such a signal indicates that the GTIN data was decoded from a Digimarc Barcode indicia, then processing that is conditioned on use of such symbology (e.g., a discounting operation) is performed. If such processing is attempted to be invoked by another branch of the terminal unit operation, it is refused. Alternatively, a flag value can be set if the GTIN data was decoded from a Digimarc Barcode indicia, as in FIG. 11.

By arrangements like those detailed above, a compliant point-of-sale system can distinguish data decoded from one particular module/symbology, from data decoded from other modules/symbologies. This capability enhances security by reducing the number of avenues available for potential fraud. In particular, point-of-sale discount fraud can be reduced by requiring that such a discount be triggered by a relatively difficult-to-counterfeit indicia, such as a Digimarc Barcode indicia. Other indicia, of types that are more readily counterfeited by criminals, are foreclosed from triggering discounts.

More generally, arrangements like those detailed indicate to a compliant system that it can act in accordance with a higher level of trust in response to certain data, due to confidence that such data was decoded from a particular decoder (e.g., indicated by telltale characteristics of the decoded data). The application of a discount indicated by such data is just one example of how such a system can act in accordance with such a higher level of trust.

More on Discount Stickers

As noted above, retailers may mark certain items with discount stickers, e.g., attracting shoppers with a conspicuous message such as "50% Off!" Such a sticker may be encoded with a machine-readable symbology that indicates, to a point-of-sale terminal, how much of a discount to apply. Or no machine-readable data may be present, in which case a checkout clerk manually applies the stated discount using a discount key on the point-of-sale terminal.

Both sorts of discount stickers are susceptible to fraud. Both are easily counterfeited (e.g., using online tools for generating barcode indicia of different sorts) and can be used to procure expensive items at unlawful discounts.

As indicated above, one way to combat such fraud is to encode a sticker with Digimarc Barcode indicia to convey the discount information, and for the point-of-sale system to apply a discount only if such instruction is signaled by a Digimarc Barcode indicia. As noted, tools to create such indicia are not widely available, posing a challenge to counterfeiters.

Additionally, or alternatively, sticker fraud can be combatted using arrangements like those detailed below.

In accordance with further aspects of the present technology, a sticker triggers a discount on an item at checkout only if the point-of-sale system verifies that the sticker was applied by an authorized store employee.

In one particular embodiment, the means to perform such verification relies on placement data that is derived from imagery captured at the time the employee applied the sticker to the item. The imagery depicts placement of the sticker on the item packaging. The derived placement data reflects minutiae of the sticker's particular placement in the context of features included in printing on the packaging. This data is stored as reference information in a database that is accessible to the point-of-sale system, but is not accessible by the general public.

When a discount sticker is encountered on an item presented for checkout, the system captures imagery of the item, derives placement data for the sticker, and checks such information against reference information stored in the database. If a matching set of placement data is found, the indicated discount is applied (and the matching set of placement data is removed or inactivated from the database). If no matching set of placement data is found, then the sticker is likely unauthorized, and no discount is applied.

In one embodiment, a store clerk is equipped with a body cam that captures imagery from a field of view in front of the clerk. (The camera may be mounted in headwear, such as an augmented reality headset. Or it may be mounted in unit hung around the clerk's neck, or from a front pocket.) As stickers are applied to markdown items, imagery is captured, depicting the precise placement of stickers on the packaging. (Image captures may be manually triggered by the clerk, or images may be captured on a running basis, and particular frames depicting stickers-on-products can be identified by subsequent image analysis.) Corresponding placement data is derived—either by a portable unit carried by the clerk, or by a remote computer—and stored in a database for later reference.

In another embodiment, the store clerk applies discount stickers to one or more items in a bin or on a shelf, and then captures an image of each such item using a smartphone or other camera-equipped portable device. In still other embodiments, a ceiling- or shelf-mounted camera system captures imagery of items to which a clerk has applied discount stickers. The clerk may be identified as authorized through detection of a Bluetooth wireless beacon carried by the clerk, which identifies the clerk to the infrastructure and triggers the camera system to capture and process images of newly-stickered items.

The placement data, which characterizes placement of a sticker in the visual context of particular product packaging, can take countless different forms. A few particular arrangements are detailed below, but it will be recognized that the present technology is not limited to such arrangements.

FIG. 13 is an image excerpt depicting a "30% off" sticker applied to sample label text, as might be captured by a clerk's smartphone after the sticker is applied to packaging for a product. (The packaging artwork is here represented as a field of text, for convenience of reference.) The sticker has a number of features that can be readily distinguished using machine vision techniques. Among these are the three corner features along the perimeter of the sticker.

In one embodiment, the placement data relates each of these three corner features to particular target points in the surrounding packaging artwork (text). In FIG. 14, the particular target points are capital letters. That is, software analyzes the captured imagery to identify the capital letters in the depicted artwork that are nearest to the three sticker feature points. Three virtual lines are then identified, each between a sticker feature point, and a target point (more particularly, to the top left corner of the nearest capital letter). Each line is characterized by a length and an angle. Three pairs of data are thereby produced, one pair for each of the sticker feature points (labeled A, B and C in FIG. 14).

The nearest capital letter to feature point A is a distance of 0.46 inches away, at an angle of 208 degrees. For feature point B the data pair are 1.35 inches and 244 degrees. For feature point C they are 1.10 inches and 110 degrees. These placement data may be represented as two vectors, one an ordered array of the length data: {0.46, 1.35, 1.10}, and one an ordered array of the angle data: {204, 244, 110}.

Figure 15:
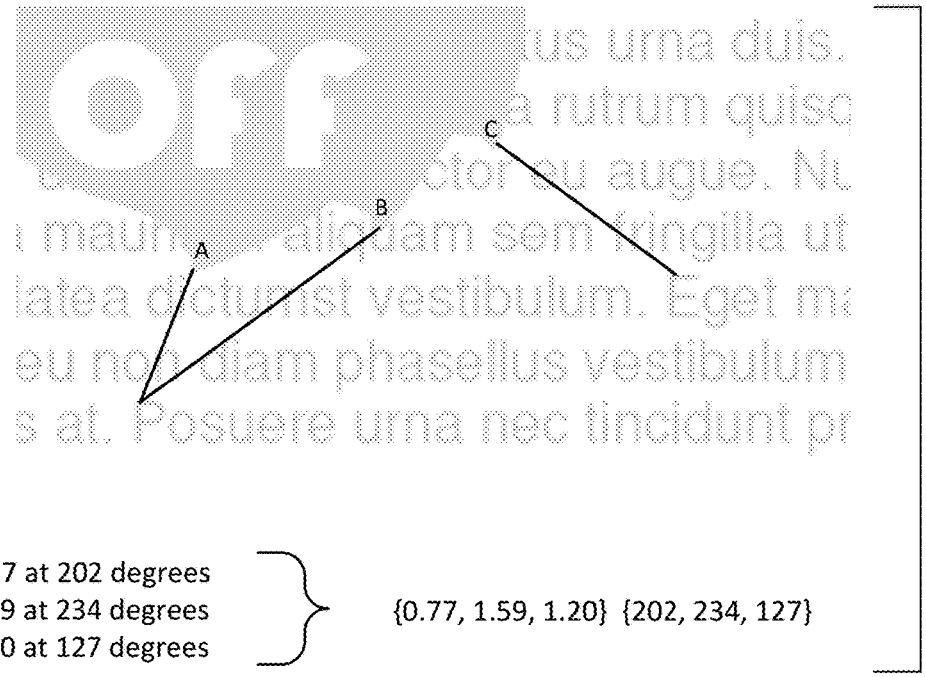
FIG. 15 is like FIG. 14, but shows a slightly different placement of a mark-down sticker on product packaging, yielding different fingerprint data.

FIG. 15 shows the same type of sticker, applied to the same type of artwork, but placed slightly differently than in FIGS. 13 and 14. As can be seen, the placement data is sensitive to slight differences in placement. Here the software computes placement data of {0.77, 1.59, 1.20} and {202, 234, 127}.

Figure 16:
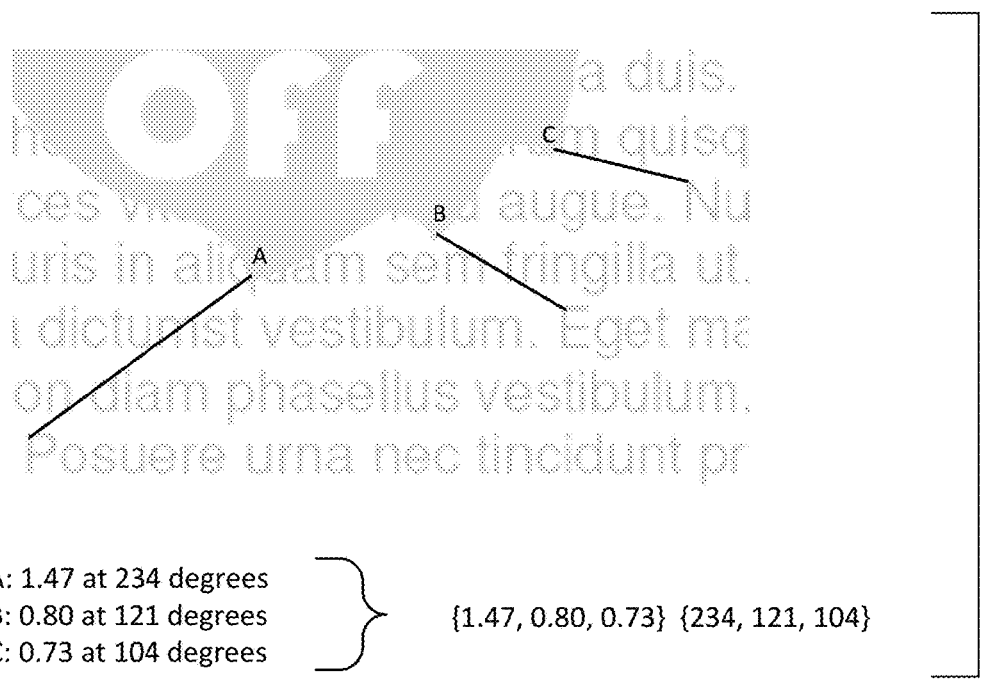
FIG. 16 is like FIG. 14, but shows another slightly different placement of a mark-down sticker on product packaging, yielding still different fingerprint data.

FIG. 16 shows the same type of sticker, applied again to the same type of artwork, but at yet another slightly different placement. Again it can be seen that the placement data varies significantly from the previous examples.

Imagery like that shown in FIGS. 13-16 is captured as the clerk applies stickers to different items, and corresponding placement data is derived for each such sticker placement. Such data is stored in a database, e.g., as shown by the table of FIG. 17.

Each row in FIG. 17 corresponds to a different item to which a markdown sticker has been applied by authorized store personnel (i.e., a person credentialed to result in storage of such information in the database). The first column shows the placement data derived from the captured imagery. The second column shows the discount. (The discount datum can be decoded from a symbology printed on the sticker—if present—or can be recognized from text printed on the sticker using OCR techniques. Alternatively, different sticker patterns can be used for different discount amounts.) The third column indicates the GTIN of the item to which the sticker was applied. This information can be decoded from imagery (if a GTIN indicia can be decoded from the imagery), or it can be manually entered. The fourth column indicates the date the placement data was stored in the database.

While the placement data is described as comprising vectors of length and angle data, many alternatives can be used. One alternative is simply to use one data or the other—length or angle data.

Another option is to identify a characteristic of the target point in the product packaging artwork, corresponding to each of the sticker feature points, and store such data. Where, as here, the target point is the upper left corner of capital letters, the characteristic may be the letter itself. In the example of FIG. 14 this would yield placement data of {PPE}. FIG. 15 would also yield {PPE}. FIG. 16 would yield {PEN}.

The fact that FIGS. 14 and 15 yield the same placement data, in the just-noted arrangement, is due to the small number of feature points in the sticker, and the small universe of target points in the label artwork. In actual practice there are typically more feature points in the sticker (e.g., more than 5, 15, or 50). Likewise, there are typically more target points used the label artwork, by a similar factor.

Desirably, an exact match is not required between the placement data stored in the database, and placement data derived at checkout. A near match is good enough. The degree of nearness required for a particular application can be selected experimentally—evaluating the possibility of a false match (with a consequence of possibly allowing a small amount of fraud) versus the possibility of a false non-match (with a consequence of possibly not awarding a discount when one should actually be applied). Normally, the latter consideration is emphasized in selecting the degree of match required (i.e., tending towards less stringent match requirements).

In one illustrative embodiment, the placement data comprises a ten element vector of length measurements (i.e., distances between ten feature points on the sticker, and ten corresponding target points in the artwork). A match is near-enough if eight of the distances discerned at checkout are each within 0.2 inches of corresponding distances in a candidate set of matching reference data.

In another illustrative embodiment, the placement data comprises a 15-element vector of angle measures. A match is near-enough if 11 of the angles sensed at checkout are each within 10 degrees of corresponding angles in a candidate set of matching reference data.

FIG. 18 shows another arrangement. In this example four corner points on the perimeter of a discount sticker are selected as feature points. These are labeled W, X, Y and Z. Around each point is a circular zone that is analyzed for a particular characteristic in the package artwork. For narrative explanation the characteristic may be a count of the letter "a" within the indicated zones. For point W, there are 7 instances of the letter "a." For points X, Y and Z there are 1, 3, and 4 instances of the letter "a" respectively. A vector of placement data, {7, 1, 3, 4} results.

Again, the number of feature points in the sticker is smaller than would typically be used, and counts of the letter "a" would not likely be used in practice. But it again illustrates the principle of deriving a set of data that characterizes placement of a sticker on a background of packaging.

In the FIG. 18 example, "near-enough" may constitute a match to a corresponding set of placement data in the database in which 75% of the individual count values are within of +/−1 of the reference data. Thus, placement data sensed at checkout of {6, 2, 4, 6} would be counted as a match to a reference string of {7, 1, 3, 4}.

Figure 19:
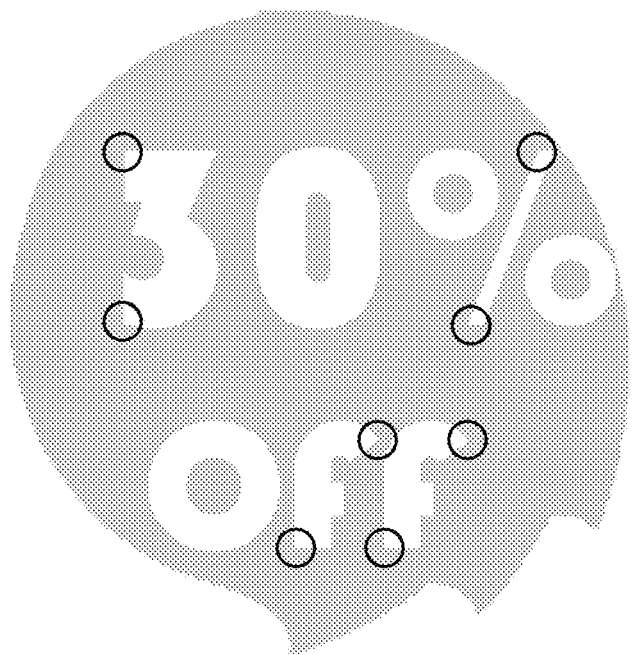
FIG. 19 illustrates corner points in a discount sticker, which can be used to derive sticker placement data.

While FIGS. 13-16 and 18 use feature points on the outside perimeter of the discount sticker, in other embodiments points in the interior are additionally or alternately used. FIG. 19 shows a selection of such interior points. These are readily recognized by machine vision techniques as being corner points.

The recognition of corner points and other salient features within imagery is a science familiar to artisans. Exemplary corner point detectors include the Harris operator and FAST. See, e.g., the Wikipedia article for Corner Detection. Perhaps most familiar among image feature points are SIFT techniques, which identify distinctive points by a difference-of-Gaussians method. Each such point is characterized by a lengthy descriptor (e.g., 128 bits). SIFT allows for the recognition of particular constellations of points despite variations in lighting, scale, rotation and other affine translations.

A retailer usually employs a small set of discount sticker styles on its merchandise. Each can be characterized by a constellation of SIFT points, based on features spaced from the perimeter. When a clerk applies one of the stickers to merchandise, and imagery is captured, the imagery is processed to discern SIFT placement data.

The image processing starts by localizing the sticker in the captured imagery. This may be done using machine readable data encoded on the sticker, by pattern matching, or by SIFT points. When the sticker is localized, imagery adjacent the sticker (e.g., within a distance of 30-100 pixels) is then analyzed to identify SIFT points.

The resulting pattern of SIFT points, both in the body of the sticker, and in the surrounding artwork, can be used as the placement data characterizing the sticker's placement on that particular artwork, in which case such SIFT data is stored in the database. Alternatively, a subset of the SIFT points identified in the surrounding artwork can be used—much like the target points in FIGS. 14-16 and 18. In this latter case, each SIFT point within the sticker can be associated with one (or more) SIFT points in the artwork—such as by proximity. Descriptors characterizing the paired points can then be stored in the database. (Again, the implementation possibilities are endless. In another implementation, the distance and/or angle to the artwork SIFT point, which is nearest each sticker SIFT point, can be used as the placement data.)

Again, when an item is presented for checkout, imagery depicting the item is processed to detect the discount sticker, and to generate associated placement data. This placement data is then compared with the reference data in the database to see if a match is found.

Given their 128-bit length, SIFT point descriptors derived when a sticker is first applied to an item by a clerk, almost never exactly match corresponding descriptors gathered when the stickered item is presented for checkout. SIFT helpfully enables a Euclidean distance measure to quantify the error. A distance threshold can be chosen to establish what degree of similarity, between SIFT descriptors, constitutes a match.

A helpful guide in establishing this threshold is the Euclidean distance between a descriptor of a particular SIFT point found on a sticker at checkout, and the average of corresponding SIFT descriptors for that point stored in the reference database. (The limited number of sticker styles allows corresponding points between stickers to be identified with high confidence.) A multiple of this distance, e.g., 1.5×, 5× or 10×, can then serve as a Euclidean distance threshold to judge matches between other descriptors, e.g., a descriptor derived from artwork at checkout, and candidate matching descriptors in the reference placement data stored in the database.

In an embodiment in which each SIFT point in the sticker is paired with a proximate SIFT point in the artwork, placement data derived from an image captured at checkout is concluded to match a set of placement data in the database if at least 30-90% (e.g., 75%) of the derived artwork descriptors are found to have counterparts in the reference set, within the just-established Euclidean distance threshold.

Figure 20:
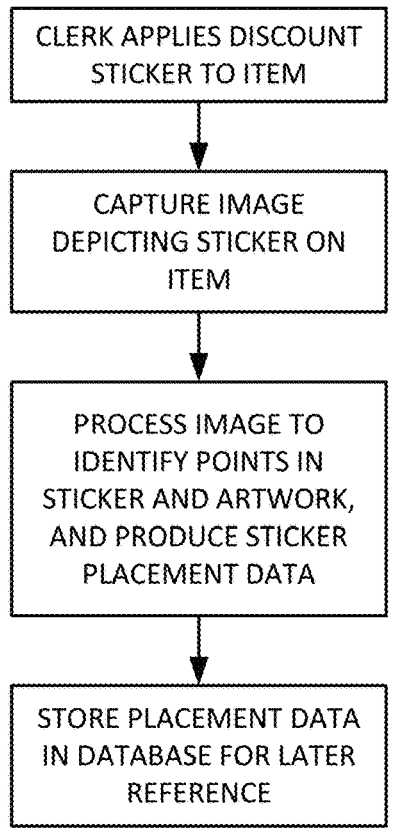
FIG. 20 details an algorithm by which reference placement data is derived and stored in a database.
Figure 21:
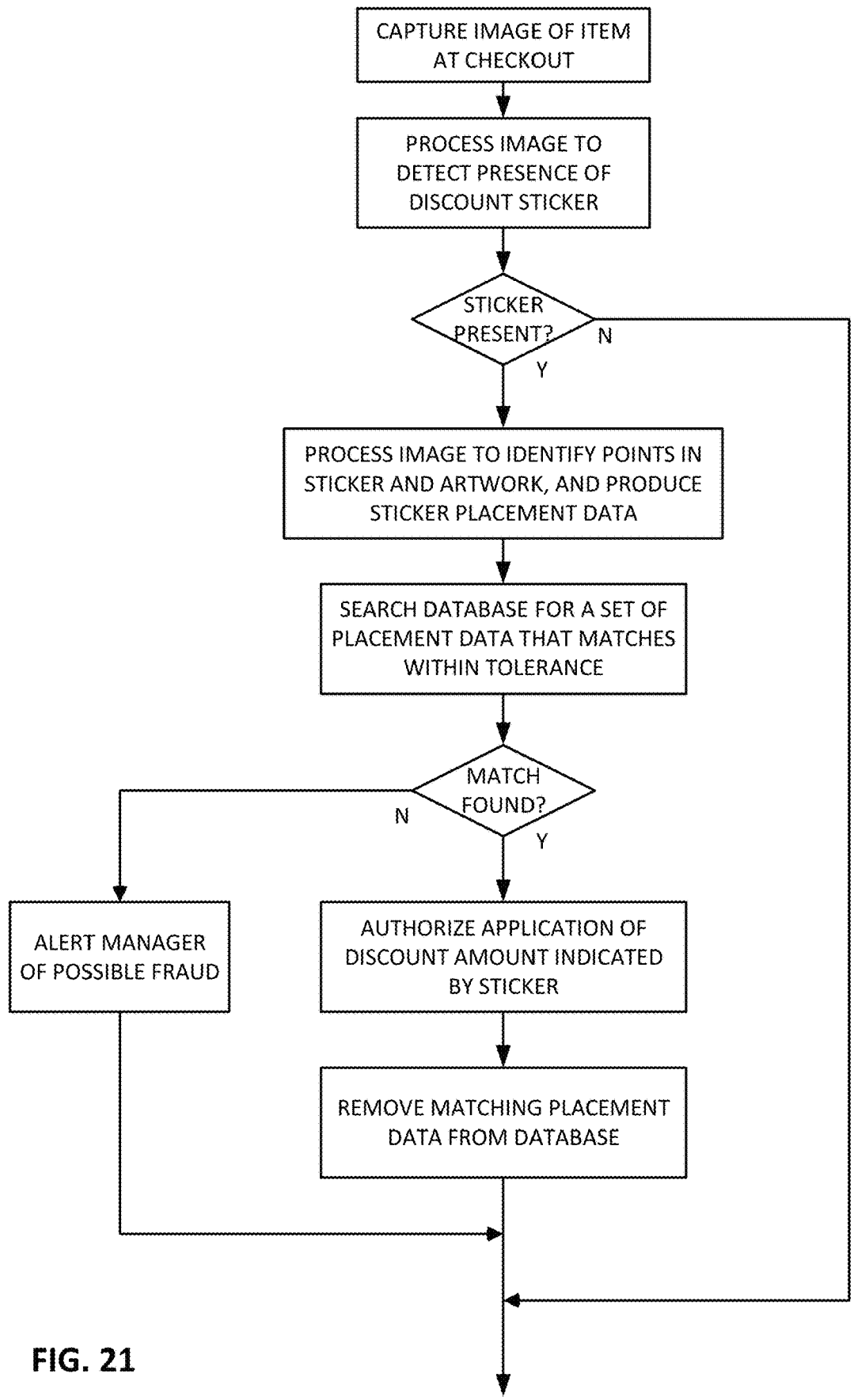
FIG. 21 details an algorithm by which reference placement data is used to authenticate a discount sticker imaged at a point-of-sale system.

FIGS. 20 and 21 detail exemplary algorithms that can be used when applying a sticker, and when reading a sticker, respectively, that employ certain of the principles described above.

The arrangements described in this section can be used to authenticate discount stickers even when the discount must be manually-applied by a clerk. In such embodiments the system can require that an image of the discount sticker placement be captured by the point-of-sale scanner, and verified, before the clerk's manual entry of the discount instruction is executed.

Stepping back, it will be recognized that in arrangements like those here-described, where sticker validity is judged based on matching placement data, there is typically nothing that a criminal can hope to successfully counterfeit. If the database has no reference data concerning a 50%-off sticker applied to a $300 bottle of Lafite Rothschild bordeaux wine, then no degree of care taken by a counterfeiter in crafting such a sticker, or positioning it on such a bottle, will be able to succeed. (If there is reference data in the database derived from such a sticker applied to such a bottle of wine, then the criminal can simply find and purchase that legitimately-marked bottle.)

Application of unauthorized stickers to items can thus be detected by image processing means and algorithms like those described above.

Food Delivery

As noted, another type of fraud involves pilferage of items by delivery drivers, such as a driver for a meal delivery service filching French fries.

In accordance with one particular embodiment, when a consumer orders a meal from a restaurant, the restaurant prepares the food, and seals it in a container with an adhesive sticker. For example, the food may be placed in a bag, and the top of the bag may be folded and secured in a folded position by a sticker. Or a tub containing soup may be closed with a lid, and a sticker applied across a junction between the tub and lid. Or for a clamshell container, a sticker can be applied across a junction where the two parts of the container meet.

The sticker has a pattern on it. So does the container. The pattern can be a logo of the restaurant. Or it can be any other type of pattern, such as a geometric design, or a digital watermark pattern.

The patterns can be standardized—with the same patterns used for all orders. Or one or both of the patterns can be printed on demand, especially for the customer's order. In such case, the pattern can include customization information—such as the customer's name, address, order contents, and/or a multi-symbol identifier that is associated with customer-related information in a database. Such customization information can be in the form of human readable text, or encoded in a machine-readable indicia—such as a conventional barcode or a Digimarc Barcode pattern (digital watermark).

Figure 22:
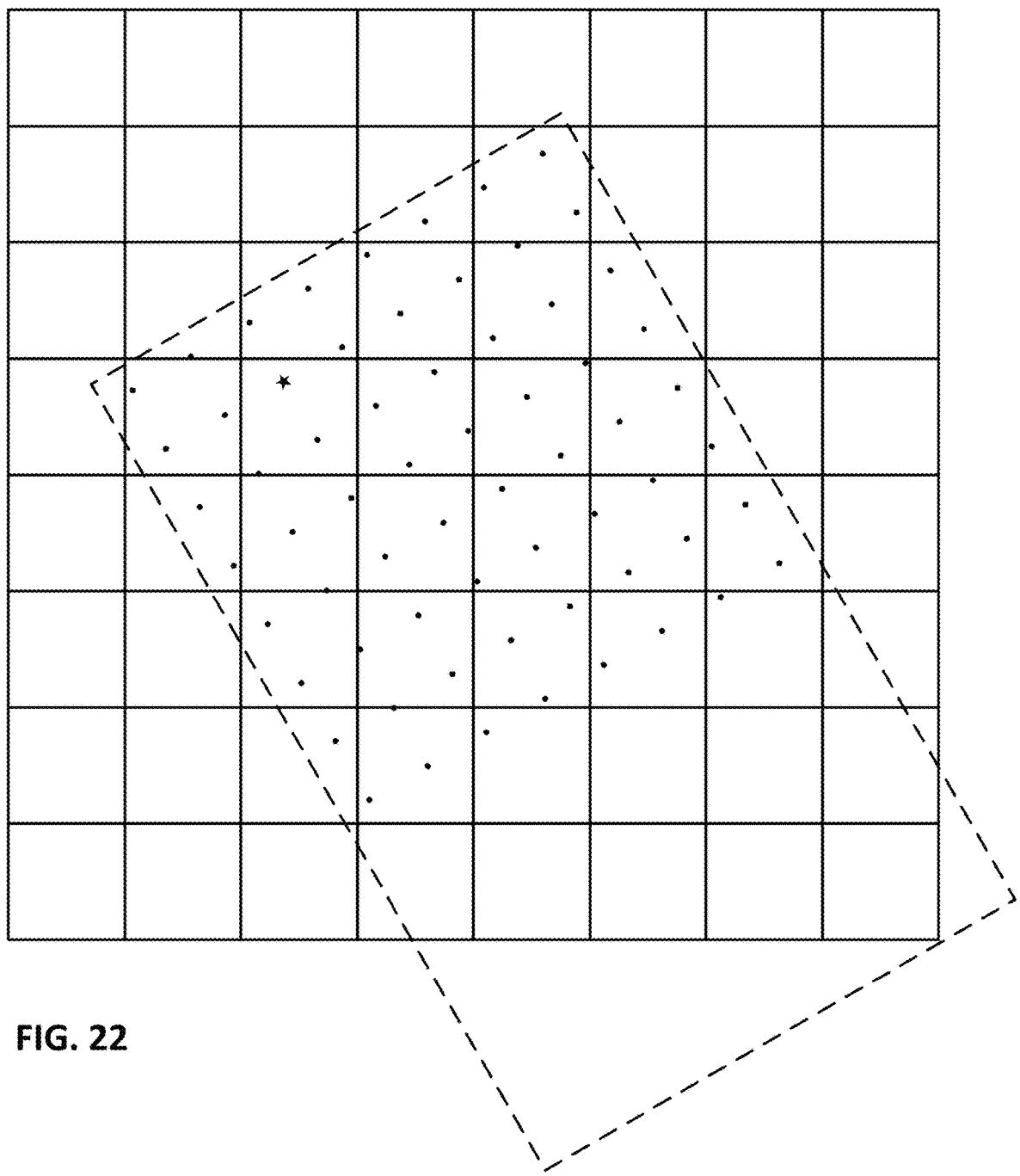
FIG. 22 schematically illustrates two patterns in a spatial relationship.

Once the food is packaged at the restaurant, and sealed with a sticker, the restaurant captures an image depicting placement of the sticker on the package. A schematic representation of such an image is shown in FIG. 22. The array of boxes is a graphical pattern as may be printed on a bag. The array of dots within a dashed outline is a pattern printed on a transparent sticker.

A fingerprint, such as was described earlier, is derived from the image. The fingerprint is dependent on the spatial relationship between the two patterns, such that if the sticker is lifted from the container, and re-attached at a different position, a different fingerprint results.

Desirably, the fingerprint is sensitive to even very small changes in position, such as changes less than a millimeter (e.g., 0.5 mm or 0.2 mm or 0.1 mm). One way to achieve such precision is to use a frame of reference defined by a digital watermark pattern.

As is familiar to artisans, digital watermark patterns conventionally include a reference, or synchronization, signal that permits precise recovery of "waxel" data. "Waxel" refers to the individual watermark elements by which watermark data is conveyed. Waxels are commonly printed at resolutions of, e.g., 75 or 150 waxels per inch (WPI). In FIG. 22, the waxels are represented by the black dots (and the star). The included reference signal enables accurate resolution of location, relative to the watermark pattern, to within less than half of a waxel—sometimes to a tenth of a waxel. At 150 wpi, a half waxel works out to a spatial accuracy of 0.0033 inches (0.085 mm).

In an illustrative embodiment, the imagery captured at the restaurant is provided to a watermark detector, which determines the scale, rotation, and translation with which watermark (e.g., on the adhesive label) is depicted in the imagery. The scale indicates a correspondence factor between watermark waxels and image pixels. The rotation indicates the angle at which rows of waxels are depicted in the captured imagery, relative to rows of pixels. The translation indicates the offset between a known position in the image data (e.g., the upper left pixel) and a known position in the watermark pattern (the so-called watermark "origin," e.g., the upper left waxel). Translation is measured in waxels and has two components—the x-translation, and the y-translation.

These parameters define a waxel frame of reference by which other features included in the captured imagery can be located, such as a distinctive feature found in the pattern on the container.

In the illustrated embodiment, the pattern on the container is an array of intersecting lines, defining boxes (a crosshatch pattern). A suitable distinctive feature (i.e., easy to detect) is a crossing of lines in such pattern. Algorithms to sense edges in imagery are well known, such as the Sobel and Canny detection algorithms. These can be used to identify lines in the captured imagery. Once lines are found, their crossings are found at points that fall on two different detected lines. (Of course other distinctive points can be used, such as SIFT points, corners of text characters, etc.)

Figure 23:
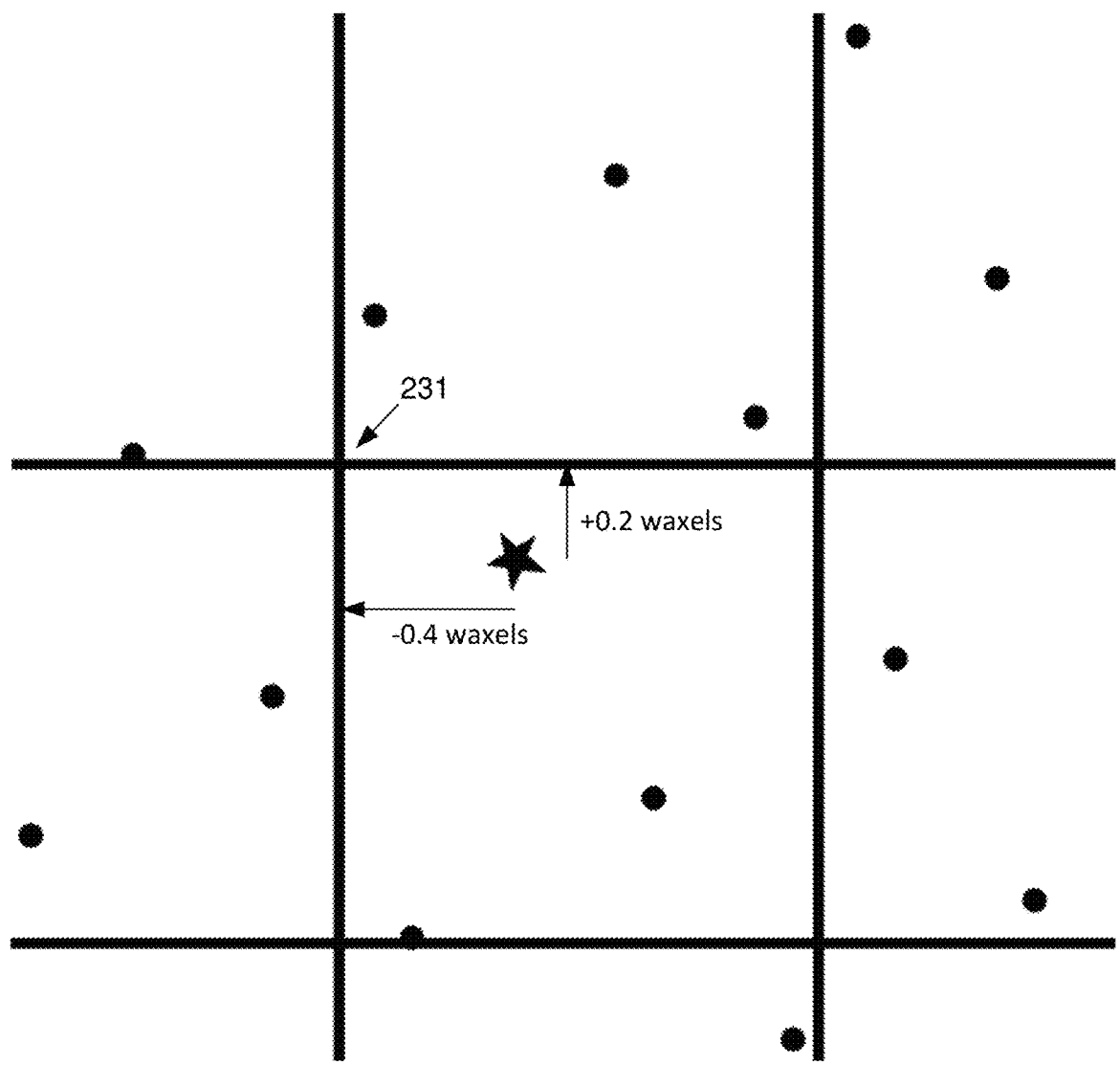
FIG. 23 is an enlargement taken from FIG. 22, showing a spatial relationship characterized by two offset distances.

In the illustrated embodiment, a fingerprint is based on the spatial relationship between the origin of the detected watermark pattern printed on the adhesive label (shown by the star), and the nearest line-crossing in the pattern printed on the container (shown as reference 231 in FIG. 23). In particular, this spatial relationship is described as the offset between the line-crossing, from the watermark origin, in waxels. As shown in FIG. 23, this offset is {−0.4, 0.2} waxels. That is, the nearest line-crossing is 0.4 waxels to the left of the watermark origin, and 0.2 waxels above it. Of course, if the pattern printed on the container were of a larger scale, with line-crossings more sparse, then the offsets would likely be larger. Likewise, if the label were not transparent (i.e., opaque), then the offsets would commonly be larger. Offset data may be in the tens or hundreds of waxels (or more).

The fingerprint data can comprise this pair of offset data, per se. Or these data can be transformed in some manner to yield other data. For example, a hashing function can be applied, which operates on the two offset parameters and produces a single datum as output.

Whether the fingerprint data is this pair of data, per se, or further data that is derived from spatial relationship data, the information is stored or transmitted for use when the container is delivered to its destination.

It will be understood that the sticker can be printed by conventional label printers. For example, the printer can be a thermal printer, such as a thermal-direct printer for printing on thermally-sensitive opaque label stock, or a thermal transfer printer, for printing on transparent label stock. In some instances a label printer is integrated with a display system, such as the thermal printer that forms part of the popular BOHA! terminal sold by Transact Technologies, Inc. Of course other printing technologies—such as xerographic and inkjet—can be used.

In a variant embodiment, the bag or other container is printed (or otherwise-formed) with a digital watermark pattern, and is sealed with a transparent tape that includes lines or other features that can be discerned by computer vision techniques (as detailed above). The orientation of the lines, or the position of a crossing of lines, within the geometrical frame of reference defined by the watermark pattern (e.g., relative to the watermark origin), establishes the fingerprint. Again, if the tape is lifted and then re-applied, it is extremely unlikely that the same fingerprint will be established.

Alternatively, the pattern printed on the bag can be a visible pattern, such as a known pattern of lines oriented in one or more directions, and the overlaid adhesive tape can be printed with other lines or features. Image analysis can be applied to detect the known pattern of the bag, and then discern the spatial placement of the tape lines in relation to that known pattern. In a further variant, the container is marked with a 2D barcode, such as a QR code. This is typically done by printing the code on a label, and affixing the label to the bag or other container. Alternatively, the code may be printed directly on the container. The QR code can include information such as the customer name, delivery address, container contents, the time the code was printed, etc. (In other embodiments the payload of the QR code may not be present, or may not be used.) A transparent tape marked with a pattern (e.g., a digital watermark pattern) is applied across a closure of the container and overlies the 2D barcode. The pattern on the transparent tape defines a frame of reference within which the 2D barcode is visible. One or more parameters describing placement of the 2D barcode within this frame of reference serves as the basis for a fingerprint.

In this arrangement, as in other arrangements detailed in this specification, the pattern can be a "sparse" digital watermark, e.g., formed by dots of ink collectively covering 20% or less of the pattern area (and more commonly covering 10%, 5%, or 3% or less of the tape area). Suitable sparse watermarks are detailed in our patent publication 20190332840. The dots can be formed by a dark ink (e.g., black or blue), or they may be formed by a light (e.g., whitish) ink, such as one having Pantone color 9520C, as detailed in U.S. Pat. No. 10,304,149 and pending application Ser. No. 15/851,143, filed Dec. 21, 2017 (now U.S. Pat. No. 10,580,103).

In a particular embodiment, the publicly-available ZXing ("Zebra Crossing") open-source QR decoder software is used to decode the QR code payload from a frame of captured imagery depicting the code. As part of this process, the software locates the QR code within the captured imagery, and adjusts the code depiction to remove geometrical distortion (e.g., resampling the imagery so that rows and columns of the black squares comprising the QR code are parallel to rows and columns of the image data). In accordance with this embodiment the re-oriented code is then passed to a digital watermark detector, which discerns the affine transformation of the watermark pattern (which was similarly re-oriented as part of the QR code re-orientation). The affine parameters for the re-oriented code discerned by the watermark detector (e.g., rotation, scale and/or translation) can serve as the basis for a fingerprint that describes spatial placement of the watermark pattern relative to the QR code pattern. For example, the scale and rotation of the watermark pattern relative to the QR code pattern can serve as the fingerprint, or the rotation and translation of the watermark pattern can so serve—or a hash based on same. (Translation may be measured from the watermark origin to the upper left corner of the QR code, as depicted in the captured imagery.)

Figure 24:
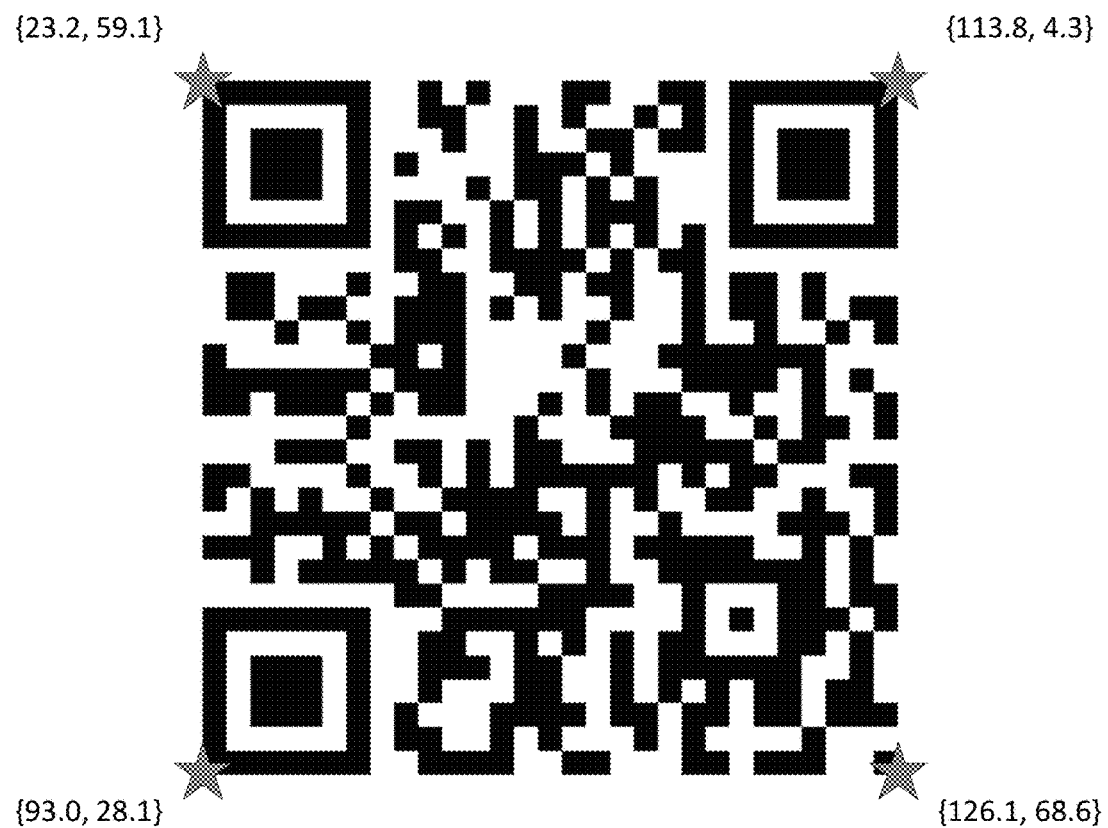
FIG. 24 shows corner locations of a 2D barcode, defined within a geometrical frame of reference established by a digital watermark pattern (not shown).

A related example is illustrated in FIG. 24. Here the x- and y-positions of the outer four corners of the QR code (denoted by stars in FIG. 24) are located in the frame of reference defined by the watermark signal. The upper left corner is found to be at watermark waxel coordinates {23.2, 59.1}, as marked in the figure. The coordinates of the other four corners are similarly marked. (The values given are dummy values.) These eight data are determined at the time the container is packed, and are stored as a fingerprint for later checking against data determined at the time of container delivery. In particular, the eight values discerned at the time of delivery are respectively subtracted from the eight earlier-stored counterpart values (or vice-versa). Each such difference value is squared, and these eight values are summed. If this sum is less than an empirically-determined threshold value (e.g., one waxel), then the watermarked tape is judged not to have been moved relative to the QR code, and the package is judged not to have been tampered with. This summation of squared differences, and comparison with a threshold, is a form of fuzzy hashing. (Such fuzzy hashing can similarly be used in other of the arrangements detailed herein, whether based on four feature points located in a pattern-defined frame of reference, or on a different number.)

In still a further arrangement, the QR code detection software locates the QR code yielding a first set of pose parameters, and watermark detection software locates the watermark yielding a second set of pose parameters. Then a transform equation (a mapping or homography—typically in the form of a matrix) is extracted that, when applied to the QR code location data (the first set of parameters), yields the watermark location data (the second set of parameters). This transform equation is stored in the cloud. When a customer or delivery person later captures imagery depicting the QR code+watermark on the package, the transform equation is retrieved from the cloud. The QR code detection software again locates the QR code—again yielding the first set of pose parameters. The retrieved transform equation is applied, producing the expected second set of pose parameters characterizing the watermark pose. The watermark decoding software then attempts to extract a payload from the captured imagery using these just-produced expected pose parameters for the watermark. If a watermark payload is successfully extracted from the imagery using these expected pose parameters, then the spatial relationship between the watermark and QR code patterns is confirmed to be unchanged; no tampering is detected. If no payload is successfully extracted, then this indicates that the seal has been lifted and re-applied (e.g., causing a more than about 0.5 waxel shift in relative position between the two patterns), indicating tampering.

Due to the cyclical nature of the watermark frame of reference, waxel positions 127.9 and 0.1 are only 0.2 waxels apart. Corrective steps can be taken to prevent this phenomenon from causing mis-leading results in the above arrangements. For example, each of the eight difference values may be difference-"modded" (from "modulo") to the nearest multiple of 64. In the example just-given, the difference between waxel positions 127.9 and 0.1 is 127.8. When difference-modded to the nearest multiple of 64 (i.e., 128), a value of 0.2 waxels results. It is this value that is squared, and summed with seven other such values to test against the threshold.

The image processing to derive the restaurant fingerprint data can be performed by hardware at the restaurant, such as a smartphone or tablet. Or the imagery may be captured by such a device at the restaurant, and transmitted to a remote clearinghouse (e.g., operated by the delivery service) for computation of the fingerprint data. In a particular implementation, the fingerprint data is stored in a database at the remote clearinghouse.

In some systems, submission of the restaurant-captured imagery is a final step in a workflow of order preparation. When such an image (or the corresponding fingerprint data) is logged at the clearinghouse, a signal is dispatched (by email, text, app notification, or otherwise) indicating to the driver (and/or the customer) that the order is ready to be picked-up.

The sealed package is picked-up by a delivery driver, who may or may not know of the security arrangement afforded by the sticker. (If the driver is informed of the security arrangement, knowledge of this fact—alone—can discourage tampering with the food.)

When the customer receives the delivery, the customer captures an image of the sticker on the container. A fingerprint is derived, as before. The result of this second fingerprinting operation is compared against the earlier fingerprinting operation performed on the restaurant-captured imagery. If the two fingerprints match within some threshold, this indicates—with a high degree of confidence—that the package has not been opened, and re-closed, since leaving the restaurant. In an exemplary embodiment, the threshold may be that x and y offsets comprising the two fingerprints each respectively match to within 0.5 waxels.

In some embodiments, a smartphone app provided by the delivery service is used by the consumer to capture the image. This app can transmit the image to a central clearinghouse for computation of the fingerprint, and comparison with the earlier-determined fingerprint. Alternatively, the app may be configured to compute the fingerprint itself, and transmit the fingerprint data to the clearinghouse. In still other embodiments, the app computes the fingerprint, obtains the reference fingerprint data earlier computed from the restaurant-captured imagery, and compares the two for correspondence.

In some implementations, the consumer is informed of this security measure, and is likely to capture imagery to enable the fingerprint check as a matter of self-interest. In other implementations, the consumer is not informed of the security measure. In such case the delivery service or the restaurant can offer a cash rebate, or a coupon good towards the next purchase, to entice the consumer to user the app to capture an image of the still-sealed package.

Some or all of the payment to the restaurant, or the driver, may be withheld until imagery of the delivered package is captured, and fingerprint comparison indicates no tampering.

If this technology indicates that a driver has opened and re-closed a food package, appropriate disciplinary measures can be taken against the driver, and appropriate amends can be provided to the consumer.

Other Anti-Tampering Arrangements

Related to the foregoing arrangements are shipping packages, such as corrugated boxes, that are susceptible to tampering. An unscrupulous worker in the delivery chain may open a box, remove an item, and reseal it. Or a more ambitious crook may open a box, remove an item, and repackage the remaining contents in a substitute box—applying new sealing tape and delivery labels. Aspects of the present technology can be used in these and other such applications.

Shipping tape is a printable medium. Amazon, for example, commonly uses tape marked with "Amazon Prime" branding. Shipping tape can be printed with a digital watermark pattern to aid in tamper detection.

In one particular arrangement, tape is manufactured in bulk from six-foot wide rolls of sheet substrate (e.g., Mylar), which is printed, spayed on one side with adhesive, and rolled on a cardboard core. This roll is then cut into two-inch widths to create individual tape rolls, which can be applied to boxes either manually or by automatic packaging equipment. The bulk substrate can be printed on either side with a digital watermark pattern (e.g., a 75 or 150 waxel per inch block, tiled to produce a pattern that is six feet in width). If the tape is transparent, then printing on the side to which adhesive is thereafter applied is preferred. This protects the printed watermark pattern from smearing and damage, e.g., due to scuffing and encounters with solvents (as may be found, for example, in the inks used in in permanent markers) during the distribution process.

Figure 25B:
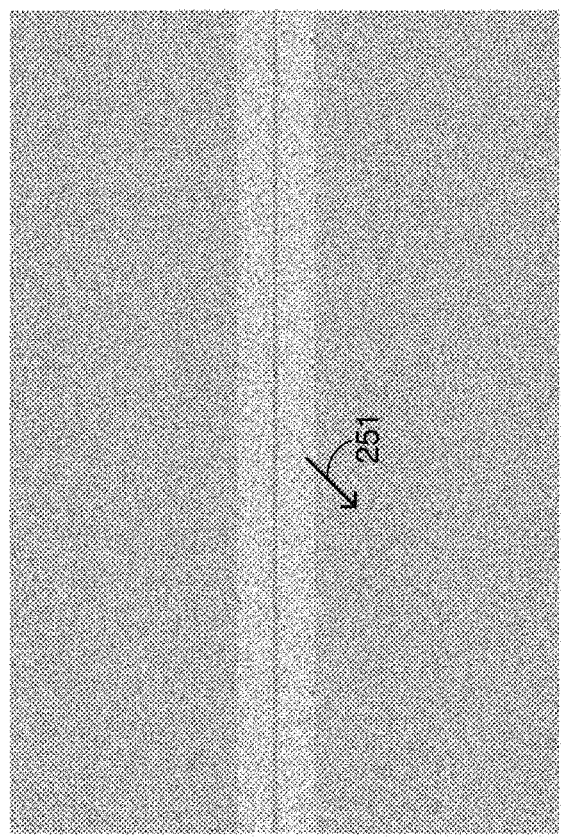
FIGS. 25A and 25B show a corrugated shipping box sealed with tape bearing a digital watermark pattern, where spatial placement of the tape on the box serves as the basis for fingerprint data that enables enabling tamper detection.
Figure 25A:
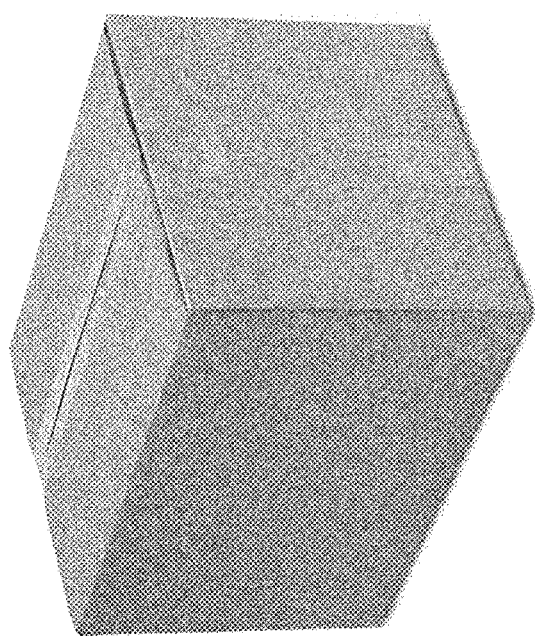

When the tape is applied to a package (FIGS. 25A and 25B), imagery of the tape's placement on the package is captured, and a fingerprint is derived by analysis of the image data and stored for later use, as described above. For example, a fingerprint can be computed based on the spatial relationship between the origin of the watermark pattern nearest the center of the box, and a proximate feature on the package. The feature may be a feature printed on the box (e.g., a nearest capital letter) or it may be a feature that is naturally-occurring in the cardboard fibers of the box. (Feature point detectors, as identified above, can commonly derive features from the natural variations in the tone or texture of cardboard.) In a simple example the fingerprint is a single vector 251, with a length and an angle. As noted, such parameters can be hashed to yield a single output datum. If the tape is lifted and reapplied (or new tape is applied), then the fingerprint will change. By capturing an image from such a package at the time of its delivery (or elsewhere in the distribution chain), and then recomputing the fingerprint data and comparing it with the earlier-stored information, tampering can be detected.

Figure 26:
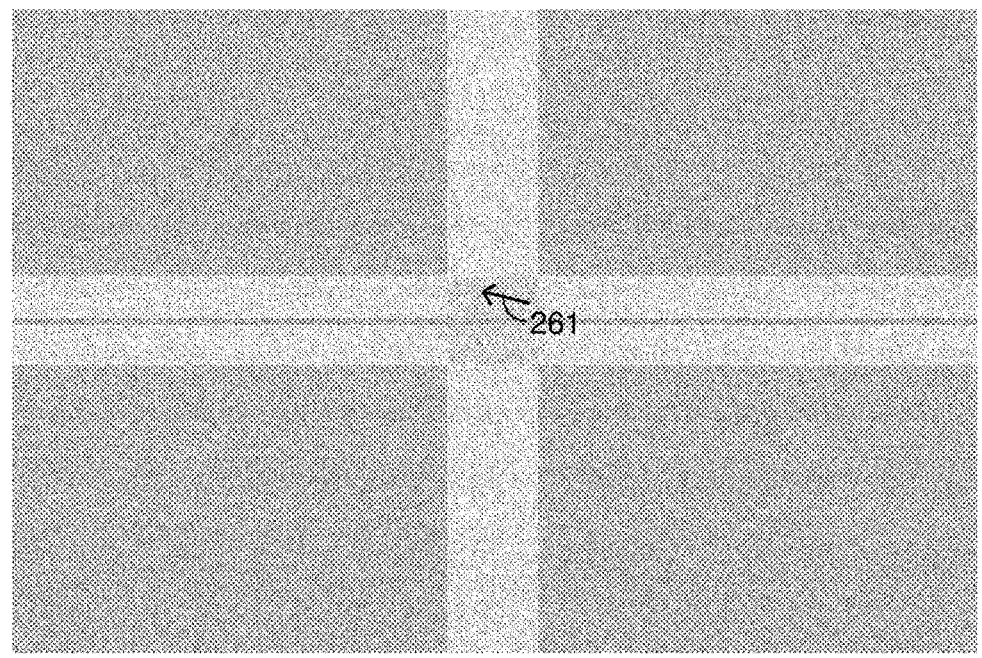
FIG. 26 shows a corrugated shipping box sealed with two pieces of tape, where spatial relationship between the two pieces of tape serves as the basis for fingerprint data that enables tamper detection.

In another embodiment, two tapes (transparent or not), printed with watermarks, are overlaid, e.g., one along a box opening, and the other across the box opening (in a generally-perpendicular direction), as shown in FIG. 26. Again, a characteristic fingerprint is derived from imagery depicting a spatial relationship between the two tapes. For example, the fingerprint may be derived from a spatial relationship between a feature defined by one tape and a feature defined by the other.

In one such embodiment the two tapes are printed with the same pattern; they may be tape strips from the same roll. In such case the fingerprint can again comprise data indicating a spatial position of one tape's watermark pattern origin relative to the other's, such as vector 261 in FIG. 26. Additionally or alternatively, the fingerprint can be based on the rotation of one pattern relative to the other.

(A conventional watermark detector, given imagery depicting the FIG. 26 overlap area, will find one watermark pattern, conclude it has succeeded, and terminate. To get a watermark detector to detect two instances of the same watermark pattern, at different rotations, requires modification of the usual detector. In particular, the detector should not search across all possible rotation values for the watermark. Instead, it should multiple times—each time over a limited range of non-overlapping rotation values. For example, the detector may initially search the captured imagery for a watermark having an orientation, relative to the captured image frame, in the range of 315-45 or 135-225 degrees. It should find one pattern meeting such criteria. It should then search again, for a watermark having an orientation in the range of 45-135 or 225-315 degrees, for which it should again find one pattern. For each such detection of a watermark pattern, the detector produces output parameters describing the affine pose of the pattern within the image frame, e.g., the scale, rotation, and x- and y-translations of the watermark pattern within the image data. If the watermark detector is of the type described in our patents U.S. Pat. Nos. 9,959,587 and 10,242,434, then the orientation ranges just-specified can be used in defining the DLS "seed" parameters around which the detector searches for a watermark pattern.)

In a different embodiment the two overlapping tapes are printed with different patterns. For example, one tape may be printed with a watermark pattern, and the second tape may be printed with brand markings (e.g., text and logos). Or one tape may be printed with a partial watermark pattern, and the second tape may be printed with a different partial watermark pattern. The two patterns collectively form a composite watermark pattern.

In the former case, the fingerprint can be based on a spatial position of a feature in the brand markings (e.g., the lower left corner of the "P" in "Amazon Prime"), relative to a frame of reference defined by the watermark (e.g., the watermark origin), such as the distance and angle data noted earlier.

In the latter case the fingerprint can be based on a spatial relationship of one partial watermark pattern relative to the other, as described earlier. (Watermarks can be detected and decoded from partial representations, e.g., due the spatial redundancy of the encoded information.) In another arrangement, the partial watermark pattern carried by one tape comprises the geometric reference signal, and the partial watermark pattern carried by the second tape comprises payload markings (e.g., dots). In such case, the markings of the second tape can be read in accordance with a geometrical frame of reference (e.g., scale, rotation, and origin location) defined by the geometric reference signal of the first tape, yielding a sequence of data that is dependent on the particular position of the latter tape relative to the former. This data sequence can serve as a fingerprint. (In such arrangement, error correcting encoding of the payload may be omitted, as decoding would then require expected relationships between payload markings at different locations within the watermark frame of reference—relationships that are uncertain without a particular frame of reference.)

In conventional watermark reading, the captured imagery is resampled (e.g., using bilinear interpolation) at an array of 128×128 waxel positions established by the affine parameters of the detected watermark reference signal. However, for the present embodiment, the depicted markings on the second tape can be resampled at a smaller number of positions, such as a 10×10 array, yielding a sequence of 100 data—typically binary values. Indeed, the second tape's pattern may be created and applied at a similar scale, i.e., blocks defining a 10×10 array of encoding locations (or a more conventional 128×128 waxel block can be used).

As with other fingerprints, the 100 element sequence can be generated from the imagery captured when the tapes are first applied by the shipper, and then sensed again at a subsequent point in the distribution chain, and the two sequences can be compared for correspondence. If 66 of the 100 binary values match, then a binomial distribution indicates a 99.9+% confidence that the area of tape overlap has not been disturbed.

In some such arrangements, the second tape can convey a noise pattern, and the same approach can be employed. That is, the noise pattern can be sampled at an array of 10×10 positions defined by the first tape's affine parameters, to yield a fingerprint sequence of 100 binary values.

In another such arrangement, the second tape can convey any pattern—such as text or graphics. Again, the pattern can be sampled to yield a sequence of 100 binary values. If the sequences derived at two different points in the distribution chain match at 66 or more places in the sequence, then there is a 99.9+% certainty that the spatial relationship of the two tapes has not been disturbed.

Figure 27:
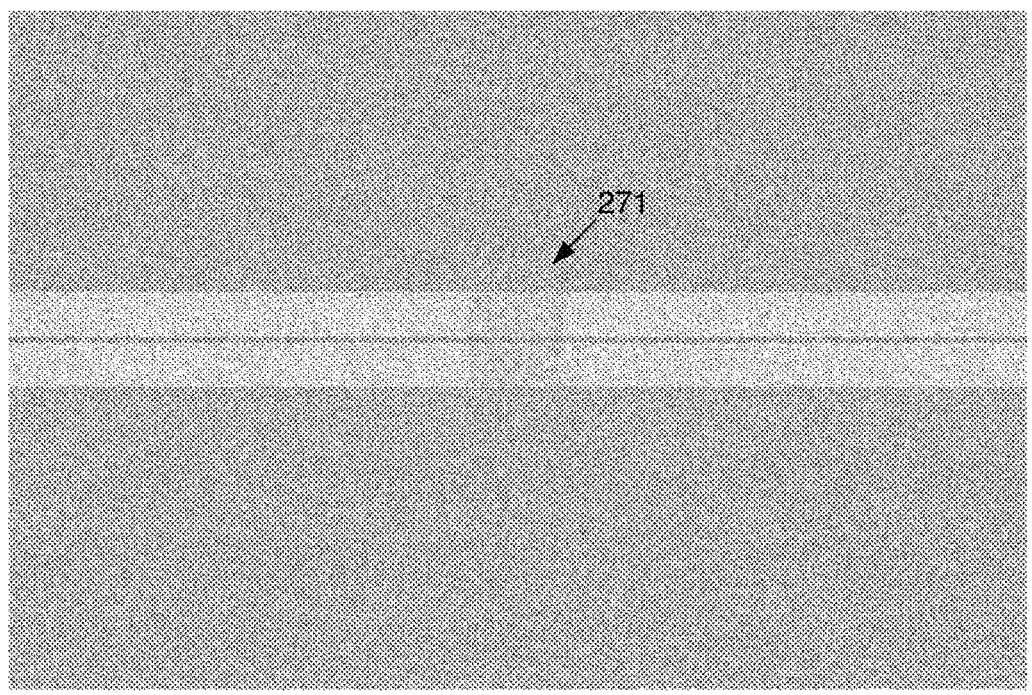
FIG. 27 shows a corrugated shipping box including a piece of tape and an inked pattern, where spatial relationship between the tape and the inked pattern serves as the basis for fingerprint data that enables tamper detection.

Still another arrangement in shown in FIG. 27. In this case the box is sealed with a single strip of tape, bearing a partial or complete digital watermark pattern. Either before or after the tape is applied, the box is printed with a pattern 271, e.g., using an inkjet coder/marker. (The printed pattern is shown as overlying a region of the tape, but it could be on the cardboard, or span both.) The inkjet pattern can be text, graphics, noise, or another partial or complete watermark pattern—either encoding the same payload as the tape watermark, or a different payload (or encoding no payload).

Any of the above-detailed arrangements for defining a fingerprint, e.g., relating the position of the tape pattern with the inkjet-applied pattern, or reading a binary sequence from one pattern using a frame of reference defined by the other pattern, can be used. Or a composite watermark can be formed from two partial patterns—one on the tape, and a second one applied by the coder-marker.

Inkjet coder-markers are desirable because they can serialize boxes at high speeds. That is, they can apply a different pattern to each box on a production line. (Coder-markers by companies such as Videojet, Keyence, Hitachi and others can print serialized patterns at speeds of 10 meters per second and above.)

The pattern (and/or text) formed by such inkjet printing can encode data that serves a purpose in addition to verifying the shipping tape has not been disturbed. For example, it can be used to print a delivery address or other shipment data in human readable form; it can convey barcode data; or it can serve to authenticate other marking on the package, e.g., comprising a hash of the recipient name and zip code. And, as noted, it can complement a partial watermark with a serialized pattern.

If the threat is a person opening a box, tampering with the contents, and putting the remaining contents in a new box, then tamper detection can be enabled without using any tape. For example, a watermark pattern can be marked—by a coder-marker—on the corrugated box itself, or on a label applied to the box. A fingerprint can be derived using arrangements described earlier, e.g., by a length and direction of a vector from the watermark origin to a feature on the carton (either naturally-occurring, or formed by other marking). If the tampered-with contents are packed in a replacement box, and the crook tries to replicate the original marking, it is statistically improbable that the crook will succeed in replicating the original fingerprint.

Figure 28:
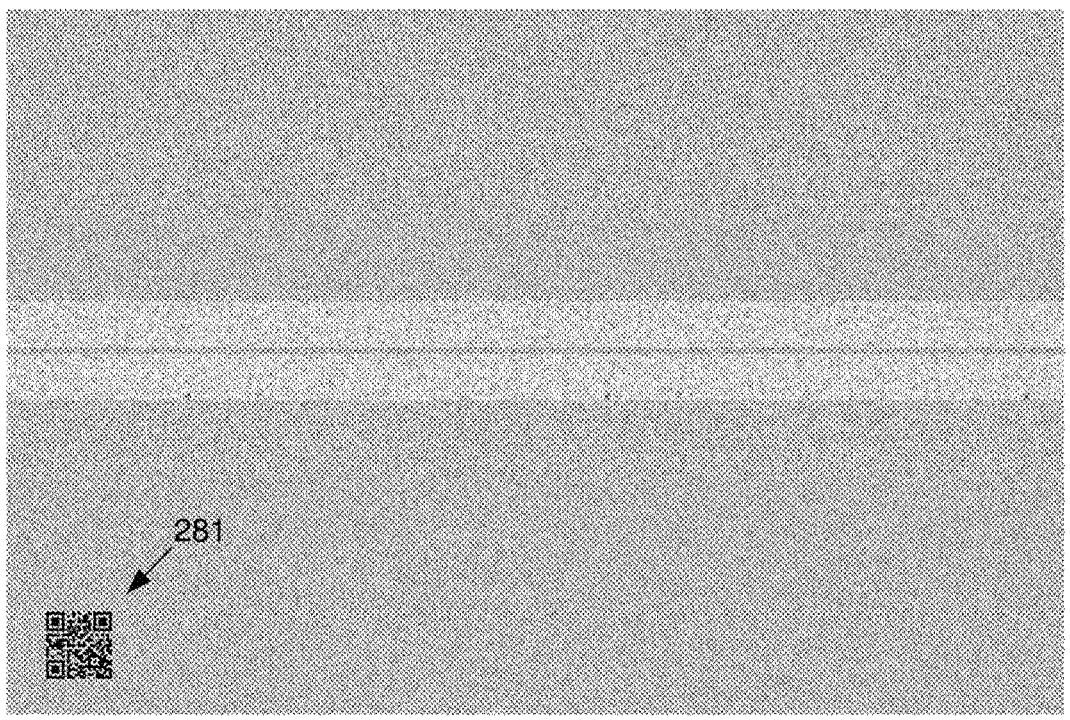
FIG. 28 shows a corrugated shipping box including a piece of tape and a barcode, where the barcode conveys fingerprint data derived from the tape's placement on the box, enabling tamper detection.

In some embodiments the originally-computed fingerprint data is stored in a cloud database, from which it can be recalled for checking against the fingerprint computed later. In other embodiments the originally-computed fingerprint data is encoded in machine-readable fashion on the package itself, e.g., in a QR code or other barcode applied to the box by inkjet printing or by a label, as shown by code 281 in FIG. 28. (Such arrangement can also be employed in the food delivery embodiments described above.)

In the arrangements detailed above in which a fingerprint is based on position of one or more features relative to the frame of reference of a watermark (e.g., the watermark origin), the payload of the watermark may not be involved, in which case the payload can be omitted. That is, the watermark can comprise just the geometric reference signal. Alternatively, the watermark pattern may encode a plural-symbol payload that serves other purposes. For example, if Acme Company has manufacturing plants in Los Angeles, Reno, and Kansas City, each plant can ship its products in boxes sealed with a packing tape encoded with an identifier that indicates the plant location (either literally, or by an identifier that can be resolved—through a database—to yield the plant location).

Concluding Remarks

Having described and illustrated aspects of the present technology with reference to exemplary embodiments, it will be recognized that applicant's inventive work is not so limited.

For example, while certain of the technologies seek to distinguish GTIN data originating from Digimarc Barcode indicia, from data originating from other indicia, this is not required. Such methods can likewise be used to distinguish data originating from any other type of machine-readable code.

While aspects of the technology are illustrated with reference to SIFT points and descriptors, it will be recognized that other feature point arrangements can be used.

Among these are SURF, GLOH, ORB and Congas. SIFT, SURF and ORB are each implemented in the popular OpenCV software library, e.g., version 4.1.0. CONGAS is used by Google for various recognition services and is detailed, e.g., in Neven et al, "Image Recognition with an Adiabatic Quantum Computer I. Mapping to Quadratic Unconstrained Binary Optimization," Arxiv preprint arXiv: 0804.4457, 2008.) SIFT is detailed in U.S. Pat. No. 6,711, 293. Additional details on feature points are provided in U.S. Pat. No. 9,269,022, and pending application Ser. No. 15/955, 481, filed Apr. 17, 2018.

Reference was made to the symbol limit of DataBar indicia. The symbol limit need not be a technical limit. It may be a practical limit—such as a limitation on the physical size of a DataBar indicia that can fit on particular product packaging. For example, small items—such a piece of cheese from a deli case—don't have much surface area for labeling. The space constraint may limit the number of symbols that can conveyed, practically, by a DataBar code. If an item identifier decoded from a product indicates it is a piece of cheese, and the data sequence sent to the POS terminal is beyond a limit of the symbol count that can be practically encoded by a DataBar indicia on such an item (as indicated, e.g., by reference data stored in a data structure), then the sequence is known to have originated with a Digimarc Barcode indicia.

Although certain aspects of the technology are illustrated in the context of authorizing mark-downs, it will be recognized that such aspects are more generally applicable, e.g., ascertaining that instructions or information indicated by a barcode and/or sticker found on an item, were placed there by an authorized person. This can be useful in confirming, e.g., that a marked item should be discarded, or donated to charity, or that a particular label is a "golden label" entitling the purchaser to a prize, etc.

While this specification describes the point-of-sale scanner and point-of-sale terminal as separate units with different functionalities, it should be understood that this is not necessary. Their functions can be combined into a single unit, and functions described as performed by one (e.g., indicia decoding, or authenticating a mark-down sticker) can be performed by the other.

Instead of characterizing a spatial relationship between a feature point on a sticker and a target point in artwork using length and angle, the same result can be achieved by using two displacements—one in an x-direction, and one in a y-direction. Similarly, instead of using inches to indicate lengths, other units can be used—including pixels.

While reference is made to collecting certain information at checkout, using a point-of-sale system, it will be recognized that newer forms of "checkout" occur in-aisle, and without clerk assistance. Some such arrangements use data collected by sensors in a shopper's mobile device and/or by sensors positioned in the shopping area of the retail store, and transactions are settled using wireless interactions with a shopper device.

In implementations employing optical character recognition, open-source software tools can be used. Exemplary are Tesseract, and ABBYY Cloud OCR API.

Database searching is an art unto itself. Some implementations of the present technology employ a brute force technique to search a database for matching placement or fingerprint data. In such arrangements, each record in the database is examined in an attempt to identify a match. In other arrangements the database is sorted, and/or indexed, to speed the matching process.

While the mark-down sticker, food delivery and corrugated box arrangements are described separately, it will be recognized that the technologies detailed in one context are equally applicable in the others.

Although fingerprint data is often described above as based on translation parameters (offsets), this is not essential. Other descriptors of spatial relationship can alternatively, or additionally, be employed. One is the angle of a line between two spatial features in one pattern, as expressed in a frame of reference defined by a watermark in the other pattern. Etc.

Similarly, while certain of the detailed embodiments focused on one article having an overt pattern (cross-hatched lines on the container), and another article having a digital watermark pattern (a Digimarc Barcode indicia printed on the adhesive sticker), this is not essential. Both articles can be marked with overt patterns (as in FIG. 13, etc.), or both patterns can be marked with digital watermark patterns. In the latter case the fingerprint can comprise the x-offset between the patterns (in waxels), the y-offset between the patterns, and/or the rotation difference between the patterns.

In the sealed package arrangements (both for food and corrugated boxes), while the consumer captures an image of the delivered package in some embodiments, in other embodiments the delivery driver can perform this operation. For example, an app on a delivery person's smartphone can be configured with a camera function that, when activated, captures an imagery of the package, and also captures GPS data identifying the location of the image capture. This data (which may include smartphone-derived fingerprint data) is sent to the clearinghouse for checking—the fingerprint data against the earlier-derived fingerprint data, and the GPS data against the customer's delivery address. In some such implementations, receipt of such data by the clearinghouse prompts the clearinghouse to dispatch a text or other query to the consumer to check that the package is in-hand—a further safeguard (e.g., against a driver snacking curbside before delivering the package). If the customer responds to the query indicating the package hadn't been delivered when the text was received, such information can be logged to help determine if such occurrences recur with unusual frequency for a particular driver.

A delivery service, or a restaurant, can compile driver-specific histories using the present technology, establishing norms by which outlier drivers can be identified. Some such information may be published to consumers (e.g., average time between a driver's security check of delivered package, and customer's confirmation of delivery), just as crowd-sourced reviews of drivers are published.

As is familiar to artisans, the Digimarc Barcode indicia is a form of digital watermarking technology. Preferred embodiments convey two signal components by the indicia—a payload signal component, and a calibration signal component (also called a reference, grid or synchronization signal component). One or both of these two components can be used in establishing feature points in stickers, and target points in packaging artwork. For example, the origin of the payload signal is located as part of the watermark detection operation, and serves to precisely identify a spatial location within the printed indicia pattern. As described in connection with the food security arrangement, if both the sticker and the packaging artwork convey Digimarc Barcode indicia, a spatial offset (e.g., in x- and y-pixels) between origins of the two indicia can be used as placement data characterizing placement of the sticker on the packaging.

Details concerning watermark encoding/decoding, and other arrangements that can be included in implementations of the present technology are disclosed in applicant's previous patent filings including US patent documents U.S. Pat. Nos. 6,122,403, 6,590,996, 6,614,914, 6,975,744, 9,245,308, 9,959,587, 10,242,434, 20160364623, 20170249491, 20190171856, 20190213705, 20190266749, 20190306385 and 20190378235, and WIPO publication WO2019165364, and in pending U.S. application Ser. No. 16/823,135, filed Mar. 18, 2020, Ser. No. 16/833,178, filed Mar. 27, 2020, and Ser. No. 16/849,288, filed Apr. 15, 2020. Other such documents are referenced earlier.

It will be recognized that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has discussed several different embodiments. It should be understood that the methods, elements and concepts detailed in connection with one embodiment can be combined with the methods, elements and concepts detailed in connection with other embodiments. For example, the fuzzy hashing arrangement of FIG. 25, in which waxel coordinates of certain features within a watermark-defined frame of reference are used as a fingerprint, can likewise be used in the embodiments of FIGS. 13-22. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The methods, processes, and systems described above may be implemented in hardware, software or a combination of hardware and software. For example, the signal processing operations for generating and reading optical codes are implemented as instructions stored in a memory and executed in a programmable computer (including both software and firmware instructions). Alternatively the operations are implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device).

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A method comprising the acts:
applying an adhesive member to a container containing one or more items;
capturing first imagery depicting the adhesive member on the container;
deriving fingerprint data from the first imagery, the fingerprint data being dependent on a spatial relationship between the adhesive member and the container; and
storing or transmitting the fingerprint data;
wherein the fingerprint data can later be used in checking whether the container has been tampered with;
wherein the container and the adhesive member each includes a respective pattern; and
wherein the act of deriving the fingerprint data includes sensing a first feature in a first of said patterns, sensing one or more second features in a second of said patterns, and determining one or more parameters detailing a spatial relationship between the first feature and said one or more second features.

2. The method of claim 1 in which the fingerprint data enables detection of relative movement between the adhesive member and the container of 1 millimeter.

3. The method of claim 1 in which the fingerprint data enables detection of relative movement between the adhesive member and the container of 0.5 millimeter.

4. The method of claim 1 in which the fingerprint data enables detection of relative movement between the adhesive member and the container of 0.2 millimeter.

5. The method of claim 1 wherein the adhesive member or the container bears a machine-readable code.

6. The method of claim 5 in which the machine-readable code is defined by a digital watermark pattern, wherein the fingerprint data is based on spatial information determined by reference to said digital watermark pattern.

7. The method of claim 1 in which the adhesive member is printed by a thermal direct process.

8. The method of claim 1 in which the adhesive member is printed by a thermal transfer process.

9. The method of claim 1 in which the adhesive member is transparent.

10. The method of claim 1 in which the adhesive smoker member is not transparent.

11. The method of claim 1 in which the container has a digital watermark pattern formed thereon, and the adhesive member has a different digital watermark pattern formed thereon, and the act of deriving the fingerprint data comprises establishing a first geometric coordinate system from one of said digital watermark patterns, and determining a position of a known point in the other of said digital watermark patterns within said first geometric coordinate system.

12. The method of claim 11 in which the known point is an origin of a second coordinate system associated with said other of said digital watermark patterns.

13. The method of claim 1 in which one of said patterns comprises a digital watermark pattern and the other of said patterns comprises a different pattern, wherein the act of deriving the fingerprint data includes:
sensing a predetermined feature in the different pattern;
establishing a geometric coordinate system from said digital watermark pattern; and
locating the sensed feature within the geometric coordinate system.

14. The method of claim 1 wherein neither of said patterns comprises a digital watermark pattern.

15. The method of claim 1 wherein only one of said patterns comprises a digital watermark pattern.

16. The method of claim 1 wherein both of said patterns comprise digital watermark patterns.

17. A method comprising the acts:
placing one or more items in a container;
closing the container;
sealing the closed container with an adhesive sticker;
capturing first imagery depicting the sticker on the closed container;
deriving first fingerprint data from the first imagery, the first fingerprint data being dependent on a spatial relationship between the sticker and the container;
storing or transmitting the first fingerprint data to enable later checking that the container has not been opened and resealed;
the method further including, after the container has been received by the recipient:
capturing second imagery depicting the sticker on the received container;
deriving second fingerprint data from the second imagery; and
checking the second fingerprint data for correspondence with the first fingerprint data.

18. The method of claim 17 that includes approving a payment upon a determination that the second fingerprint data corresponds with the first fingerprint data.

19. The method of claim 1 that includes sealing said container with said adhesive member.

20. The method of claim 1 that further includes, at a time after said storing or transmitting of the fingerprint data: receiving second imagery depicting the adhesive member on the container; deriving second fingerprint data from the second imagery; and checking for tampering with the sealed container by checking the second fingerprint data for correspondence with the stored or transmitted fingerprint data.

21. A method of authenticating that an adhesive member which was attached to a container by a first party, was not subsequently lifted and re-attached to said container by a second party prior to delivery of said container to a third party, the method comprising the acts:
from imagery depicting the adhesive member as attached to the container by the first party, detecting a watermark pattern to establish a frame of reference, and determining first locations of one or more features within said frame of reference, said first locations being dependent on placement of the adhesive member on the container by the first party;
from imagery depicting the adhesive member as attached to the container at said delivery of the container to the third party, detecting said watermark pattern to establish the frame of reference, and determining second locations of said one or more features within said frame of reference, said second locations being dependent on placement of the adhesive member on the container at said delivery of the container to the third party;
checking the first and second locations for disagreement; and determining that said first and second locations correspond within an expected degree, thereby authenticating that the adhesive member was not lifted and re-attached to said container by the second party;

wherein one of said adhesive member or container is formed to convey said watermark pattern, and the other of said adhesive member or container includes said one or more features.

22. An anti-tampering method that employs first and second patterns, one of the two patterns being marked on a container, the method comprising the acts:

applying an adhesive member, marked with the other of said patterns, to the container;

receiving imagery depicting the first and second patterns on the container;

deriving fingerprint data from the imagery; and storing or transmitting the fingerprint data, to enable later use of the fingerprint data to check for tampering with said container;

wherein:

a first of said patterns comprises a digital watermark pattern; and the act of deriving the fingerprint data includes sensing a synchronization signal from the digital watermark pattern, and using said synchronization signal in characterizing a spatial relationship between the first and second patterns on the container.

23. The method of claim 22 that includes using said synchronization signal to establish a geometric coordinate system, and locating one or more points in the second pattern in relation to said geometric coordinate system.

24. The method of claim 23 in which the second pattern comprises a QR code, and the method includes locating a corner point of the QR code in relation to said geometric coordinate system.

25. The method of claim 22 in which the second of said patterns also comprises a digital watermark pattern.

26. The method of claim 22 in which the second of said patterns comprises a QR code or other 2D barcode.

27. The method of claim 26 that includes re-orienting the received imagery so that rows and columns of elements of the QR or other 2D barcode are parallel to rows and columns of the re-oriented imagery, and using the synchronization signal to characterize affine parameters of the watermark pattern in the re-oriented imagery.

28. The method of claim 27 that includes using rotation of the watermark in the re-oriented imagery, and one or both of scale and translation of the watermark in the re-oriented imagery, as parameters of the fingerprint data.

29. The method of claim 22 in which the container is marked with a barcode, and the method includes sealing a closure of the container with an adhesive tape, the adhesive tape serving as said adhesive member, said adhesive tape being marked with the first pattern comprising the digital watermark pattern; wherein the synchronization signal of the digital watermark pattern on the adhesive tape defines a frame of reference, and one or more parameters describing placement of the barcode within said frame of reference serves as a basis for the fingerprint data.

30. The method of claim 22 that further includes the act of marking the container with said one of the two patterns by printing, or by applying a label to the container.

31. The method of claim 22 that includes sealing said container with said adhesive member.

32. The method of claim 22 that further includes, at a time after said storing or transmitting of the fingerprint data:

receiving second imagery depicting the first and second patterns on the container;

deriving second fingerprint data from the second imagery; and checking for tampering with the container by checking the second fingerprint data for correspondence with the stored or transmitted fingerprint data.

\* \* \* \* \*